(12) United States Patent
Kelsey

(10) Patent No.: US 9,234,121 B2
(45) Date of Patent: Jan. 12, 2016

(54) MULTI-LAYERED ARTICLES HAVING DISCONTINUOUS ADHESIVE REGIONS

(71) Applicant: W. L. Gore & Associates, Inc., Newark, DE (US)

(72) Inventor: William D. Kelsey, Elkton, MD (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 13/873,888

(22) Filed: Apr. 30, 2013

(65) Prior Publication Data
US 2014/0322497 A1    Oct. 30, 2014

(51) Int. Cl.
| | |
|---|---|
| C09J 7/04 | (2006.01) |
| B32B 7/04 | (2006.01) |
| B32B 5/04 | (2006.01) |
| B32B 5/26 | (2006.01) |
| B32B 7/14 | (2006.01) |
| B32B 37/00 | (2006.01) |
| B32B 27/12 | (2006.01) |
| D06M 17/04 | (2006.01) |
| D06M 17/06 | (2006.01) |
| D06M 17/08 | (2006.01) |
| D06M 17/10 | (2006.01) |
| D06M 23/16 | (2006.01) |

(Continued)

(52) U.S. Cl.
CPC ... *C09J 7/04* (2013.01); *B32B 5/04* (2013.01); *B32B 5/26* (2013.01); *B32B 7/045* (2013.01); *B32B 7/14* (2013.01); *B32B 27/12* (2013.01); *B32B 37/0084* (2013.01); *B32B 37/1292* (2013.01); *D06M 17/04* (2013.01); *D06M 17/06* (2013.01); *D06M 17/08* (2013.01); *D06M 17/10* (2013.01); *D06M 23/16* (2013.01); *B32B 37/1284* (2013.01); *B32B 37/144* (2013.01); *B32B 38/10* (2013.01); *B32B 2305/188* (2013.01); *B32B 2307/304* (2013.01); *B32B 2307/3065* (2013.01); *B32B 2307/51* (2013.01); *B32B 2307/54* (2013.01); *B32B 2307/724* (2013.01); *B32B 2307/7265* (2013.01); *B32B 2307/736* (2013.01); *Y10T 428/24636* (2015.01)

(58) Field of Classification Search
None
See application file for complete search history.

(56) References Cited

U.S. PATENT DOCUMENTS

| | | | |
|---|---|---|---|
| 2,789,076 A | * | 4/1957 | Frieder et al. .......... 428/86 |
| 3,316,136 A | | 4/1967 | Pufahl |

(Continued)

FOREIGN PATENT DOCUMENTS

| | | |
|---|---|---|
| JP | S61-057335 | 3/1986 |
| JP | S61-222734 | 10/1986 |
| JP | S63-092443 | 4/1988 |

OTHER PUBLICATIONS

International Search Report—PCT/US2014/032617—Oct. 28, 2014.

*Primary Examiner* — David Sample
*Assistant Examiner* — Donald M Flores, Jr.
(74) *Attorney, Agent, or Firm* — Amy L. Miller

(57) ABSTRACT

Multi-layered articles that include a first textile and an adhesive layer having a non-uniform adhesive pattern is provided. The non-uniform adhesive pattern creates regions free or substantially free of adhesive. The adhesive regions, together with the non-adhesive regions, create a visible pattern on the surface of the article. A second textile may optionally be bonded to the adhesive opposing the first textile to form a multi-layered article. The first textile or adhesive layer may be shrinkable or expandable. Additionally, the multi-layered article has a stretch force at 20% elongation of less than three times the stretch force of the first textile at 20% elongation. The multi-layered articles are breathable, insulative, aesthetically pleasing, and demonstrate superior stretch and recovery properties.

74 Claims, 18 Drawing Sheets

(51) Int. Cl.
- *D06M 17/00* (2006.01)
- *D06M 23/00* (2006.01)
- *B32B 37/12* (2006.01)
- *B32B 37/14* (2006.01)
- *B32B 38/10* (2006.01)

(56) References Cited

U.S. PATENT DOCUMENTS

| | | | |
|---|---|---|---|
| 3,703,730 A * | 11/1972 | Miller | 2/272 |
| 4,701,964 A * | 10/1987 | Bell et al. | 2/406 |
| 4,935,287 A | 6/1990 | Johnson et al. | |
| 5,628,741 A * | 5/1997 | Buell et al. | 604/385.27 |
| 5,789,327 A * | 8/1998 | Rousseau | 442/135 |
| 5,814,178 A | 9/1998 | Jacobs | |
| 5,916,829 A * | 6/1999 | Girard et al. | 442/244 |
| 6,395,383 B1 * | 5/2002 | Maples | 428/319.3 |
| 6,559,350 B1 * | 5/2003 | Tetreault et al. | 602/42 |
| 7,601,416 B2 * | 10/2009 | Palley | 428/171 |
| 2004/0247821 A1 | 12/2004 | Zafiroglu | |
| 2009/0123713 A1 * | 5/2009 | Conley et al. | 428/196 |
| 2011/0167547 A1 | 7/2011 | Jain | |

\* cited by examiner

MULTI-LAYERED ARTICLES HAVING DISCONTINUOUS ADHESIVE REGIONS

FIELD OF THE INVENTION

The present invention relates generally to multi-layered articles, and more specifically, to multi-layered articles that include a textile layer and an adhesive layer having a discontinuous coating pattern. A textile may optionally be bonded to the adhesive layer on a side opposing the first textile.

DEFINITIONS

As used herein, the term "multi-layered article" means an article comprising an adhesive layer and at least one layer of textile.

As used herein, the term "textile" is meant to denote any wovens, nonwovens, felts, or knits and can be composed of natural and/or synthetic fiber materials and/or other fibers or flocking materials.

As used herein, the term "adhesive" is meant to denote any substance that adheres to one or more layers, including, but not limited to, textiles. The adhesive may be applied continuously or discontinuously to form a coating.

As used herein, the term "elastomeric" is meant to denote an article that elongates under tension and returns to its approximate dimensions upon the release of the tension.

BACKGROUND OF THE INVENTION

Discontinuously coated textiles are known in the art. It may be advantageous to coat a textile with a discontinuous polymer layer in order to provide surface texture, abrasion resistance, aesthetic interest, or as an intermediate step in creating a laminated article. For example, discontinuous epoxy coatings are applied to textiles to provide abrasion resistance. Although advantages exist for discontinuously coating textiles, there are several shortcomings. As one example, it is difficult to increase the amount of surface texture without significantly increasing the coating thickness. As a result, if a large amount of surface texture is desired, a thick coating would need to be applied which would negatively impact both weight and flexibility of the article. Additionally, existing discontinuous coatings do not substantially improve the thermally insulative qualities of the article beyond the extent to which the coatings themselves are thermally insulative. Thus, assuming that a particular coating consists of some insulative material, increased thermal resistance can only be achieved by increasing the coating thickness, which also detrimentally increases the weight and decreases the flexibility of the article. Another example is that existing discontinuous coatings act to increase the stretch force of the coated textile. Thus, if a discontinuously coated textile is desired, an increase in the force required to stretch the textile will result.

There exists a need in the art for a coated article that provides novel aesthetic characteristics, as well as enhanced surface texturization and increased thermal insulative properties, while maintaining both low weight, flexibility, and ease of stretch.

SUMMARY OF THE INVENTION

It is an object of the present invention to provide a multi-layered article that includes (1) a first textile and (2) an adhesive layer positioned on the first textile. The adhesive layer contains two or more adhesive regions separated by regions substantially free of adhesive. In addition, each of the adhesive regions contains a plurality of adhesive dots. The adhesive dots may be distributed non-uniformly within the adhesive regions. In exemplary embodiments, a distance between adjacent adhesive dots within the adhesive regions is less than a distance between consecutive adhesive regions. The adhesive regions may be continuous or contain gaps. In addition, in at least one embodiment, the adhesive regions form at least one distinctive shape that is repeated two or more times. The distinctive shape may be a geometric or abstract shape. A second textile may be positioned on the adhesive layer on a side opposing the first textile. The first textile may be an elastic textile or a shrinkable textile and/or the adhesive may be a shrinkable adhesive. The multi-layered article has a stretch force at 20% elongation of less than three times the stretch force of the first textile at 20% elongation. A radius of curvature of the first adhesive regions is from about 1 mm to about 20 mm.

It is another object of the present invention to provide a multi-layered article that includes (1) a first textile and (2) an adhesive layer positioned on the first textile where the adhesive layer contains first adhesive regions and second adhesive regions. The first adhesive regions contain an amount of adhesive that is greater than an amount of adhesive present in the second adhesive regions. In exemplary embodiments, the multi-layered article has a stretch force at 20% elongation of less than three times the stretch force of the first textile at 20% elongation. In addition, the first adhesive regions form at least one distinctive shape (e.g., geometric or abstract) that is repeated two or more times. Also, the first adhesive regions may contain a plurality of adhesive dots. The adhesive dots may or may not be substantially the same size. In some embodiments, the adhesive dots positioned on an outer portion of the first adhesive regions have a diameter that is larger than adhesive dots positioned on an inner portion of the first adhesive regions. In other embodiments, the first adhesive region is formed of a continuous band of adhesive surrounding a plurality of adhesive dots. These adhesive dots may also have the same or differing sizes. In yet other embodiments, the adhesive in the first adhesive region forms a grid-like pattern.

It is a further embodiment of the present invention to provide (1) a first textile and (2) an adhesive layer positioned on the first textile where the adhesive layer contains at least one first region having a first percent area coverage of adhesive and at least one second region having a second percent area coverage of adhesive. The first percent area coverage of adhesive is greater than the second area coverage of adhesive. Additionally, the first region forms at least one distinctive shape (e.g., a geometric or abstract form) that is repeated two or more times. In at least one embodiment, the first region contains a plurality of adhesive dots. The adhesive dots may be distributed non-uniformly within one or more of the first adhesive regions. In exemplary embodiments, the second region is free or substantially free of adhesive. A second textile may be positioned on the adhesive layer on a side opposing the first textile. The first textile may be an elastic textile or a shrinkable textile and/or the adhesive may be a shrinkable adhesive.

It is yet another object of the present invention to provide a method of forming a multi-layered article that includes (1) tensioning a first textile, (2) applying an adhesive layer containing first adhesive regions and second adhesive regions to the tensioned first textile to form a multi-layered article, and (3) allowing the multi-layered article to relax, which results in a curling of the multi-layered article in the areas corresponding to the adhesive regions. The first adhesive regions contain an amount of adhesive that is greater than an amount of adhesive present in the second adhesive regions. A concave surface of each of the adhesive regions is positioned toward the first textile. The method may further include positioning a second textile on the adhesive layer prior to allowing the multi-layered article to relax. In such an embodiment, the second textile substantially follows the contour of the first textile. In addition, the multi-layered article has a stretch force at 20% elongation of less than three times the stretch force of the first textile.

It is also an object of the present invention to provide a method of forming a multi-layered article that includes (1) bonding a shrinkable adhesive to a first textile to form a multi-layered article and (2) shrinking the adhesive, which results in a curling of the multi-layered article in the areas corresponding to the adhesive regions. In particular, a concave surface of each of the adhesive regions is positioned towards the adhesive. The first adhesive layer contains adhesive regions and regions substantially free of adhesive. The regions substantially free of adhesive are interspaced between the adhesive regions. In addition, the adhesive regions have at least one distinctive shape. A second textile may be positioned on the shrunk adhesive on a side opposing the first textile. Additionally, the multi-layered article has a stretch force at 20% elongation of less than three times the stretch force of the first textile at 20% elongation.

It is yet another object of the present invention to provide a method of forming a multi-layered article that includes (1) bonding a shrinkable textile to an adhesive layer that contains at least one first region having a first percent area coverage of adhesive and at least one second region having a second percent area coverage of adhesive and (2) shrinking the textile, which results in a curling of the multi-layered article in the areas corresponding to the adhesive regions. In such an embodiment, the multi-layered article curls towards the shrunk textile. Also, the first percent area coverage of adhesive is greater than the second area coverage of adhesive. A second textile may be positioned on the adhesive prior to or after shrinking the first textile. When the second textile is positioned on the adhesive layer prior to shrinking the textile, the second textile substantially follows the contour of the shrinkable textile.

It is an advantage of the present invention that the multi-layered articles demonstrate a reduction in stiffness and improved insulation properties.

It is also a feature of the present invention that the textile and/or the adhesive may comprise a fire retardant or fire resistant material.

It is another feature of the present invention that the multi-layered article has a stretch force at 20% elongation of less than three times the stretch force of the first textile at 20% elongation.

It is yet another feature of the present invention that the multi-layered articles exhibit a surprisingly low stretch force relative to the stretch force required to stretch the first textile alone.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE FIGURES

The advantages of this invention will be apparent upon consideration of the following detailed disclosure of the invention, especially when taken in conjunction with the accompanying drawings wherein.

DETAILED DESCRIPTION OF THE INVENTION

Figure 1:
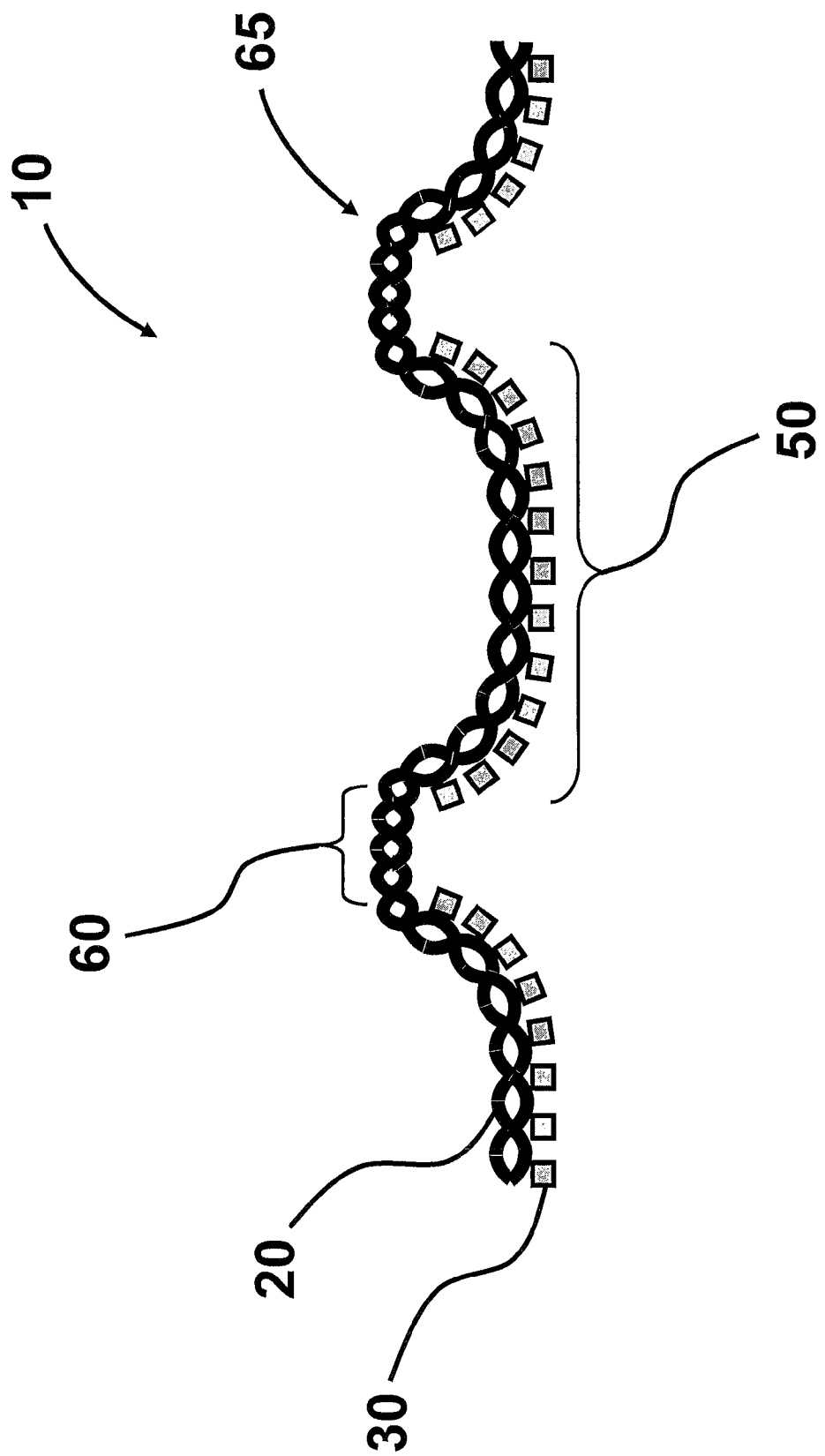
FIG. 1 is a schematic illustration of a multi-layered article having discontinuous adhesive dots in the adhesive regions and raised portions corresponding to the non-adhesive regions according to one embodiment of the invention.

Unless defined otherwise, all technical and scientific terms used herein have the same meaning as commonly understood by one of ordinary skill in the art to which the invention belongs. In the drawings, the thickness of the lines, layers, and regions may be exaggerated for clarity. It will be understood that when an element such as a layer is referred to as being "on" another element, it can be directly on the other element or intervening elements may also be present. Also, when an element is referred to as being "adjacent" to another element, the element may be directly adjacent to the other element or intervening elements may be present. The terms "top", "bottom", "side", and the like are used herein for the purpose of explanation only. Like numbers found throughout the figures denote like elements. In addition, the terms "multi-layered article" and "article" may by interchangeably used herein. Additionally, the terms "bonded region" and "adhesive region" may be used interchangeably herein.

The present invention is directed to multi-layered articles that include a textile and an adhesive layer that has a distinctive, discontinuous adhesive pattern. The discontinuous adhesive pattern creates a visible, aesthetically pleasing surface on the textile. The discontinuous adhesive pattern also creates regions free or substantially free of adhesive within the multi-layered article that permits the article to preferentially bend in those non-adhesive regions. In at least one exemplary embodiment, at least one of the textile(s) and the adhesive is elastic or otherwise stretchable. The multi-layered article is breathable and, in some embodiments, may be water resistant.

Turning to FIG. 1, a three-dimensional multi-layered article 10 according to at least one exemplary embodiment can best be seen. As shown in FIG. 1, a first textile 20 has applied thereto an adhesive 30. The first textile 20 can be any woven, nonwoven, felt, or knit and may be formed of natural and/or synthetic fiber materials. The first textile 20 may be inelastic or elastic or may otherwise be manipulated to change dimensions (e.g., shrinks or elongates). As used herein, the term "elastic" is meant to denote a material that can be tensioned and then returns to its approximate original dimensions upon release of the tension. "Shrink", as used herein, is meant to denote a reduction of a particular component from its initial dimension to a smaller dimension. Shrinkage can be achieved by physically acting upon it (e.g., applying heat or cold) or by the removal of a force (e.g., removing a force causing the particular component to be in a tensioned state). Non-limiting examples of suitable textiles for use as the first textile 20 include nylon, polyester, polypropylene, cotton, wool, silk, aramid, polyethylene, rayon, acrylic, olefin, spandex, and the like. Additionally, the first textile 20 may be a fire resistant or fire retardant textile. The first textile 20 may also contain UV protective materials and/or may otherwise be coated or treated to provide desired characteristics.

Figure 2:
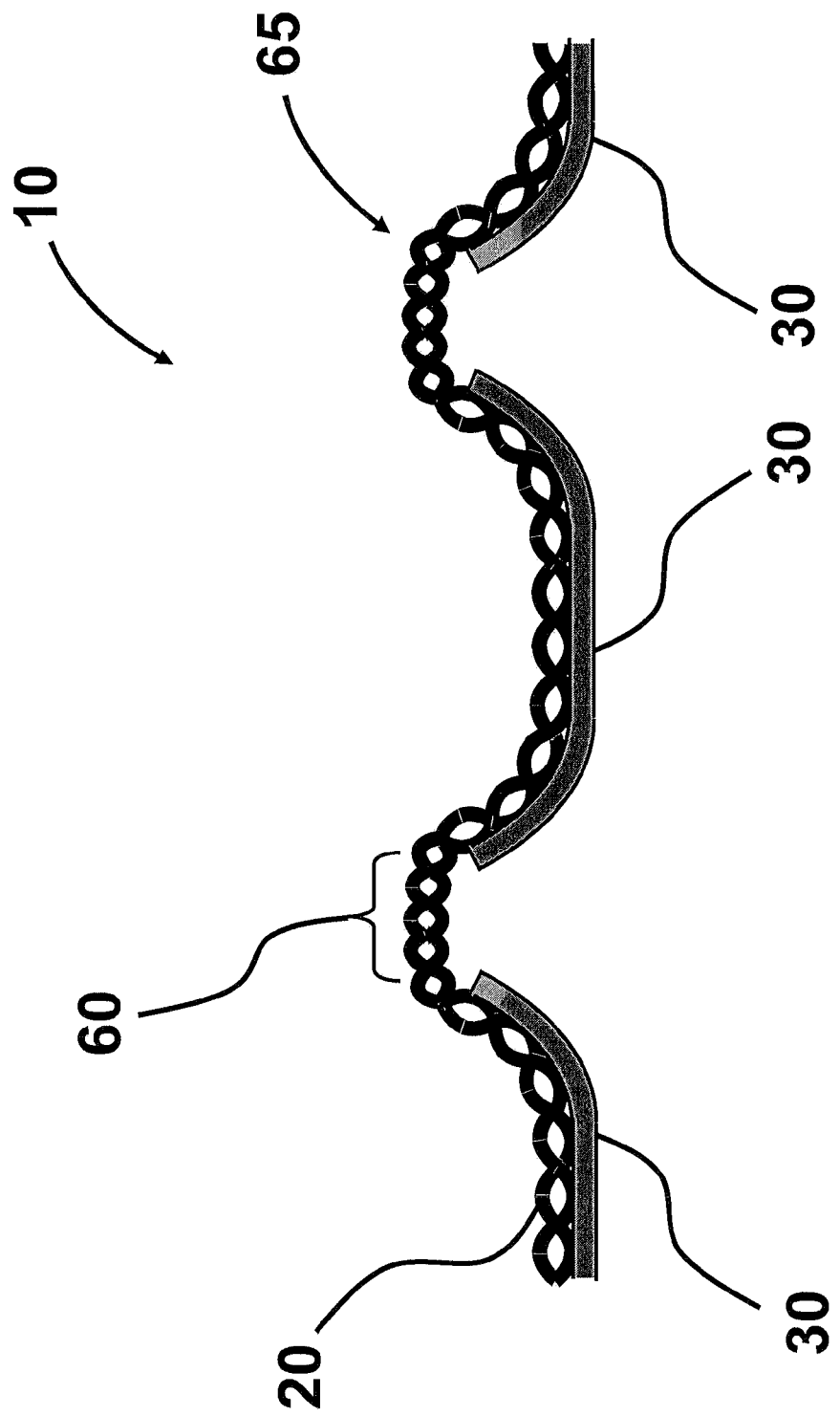
FIG. 2 is a schematic illustration of a multi-layered article having a continuous adhesive in the adhesive regions according to another exemplary embodiment of the invention.
Figure 2A:
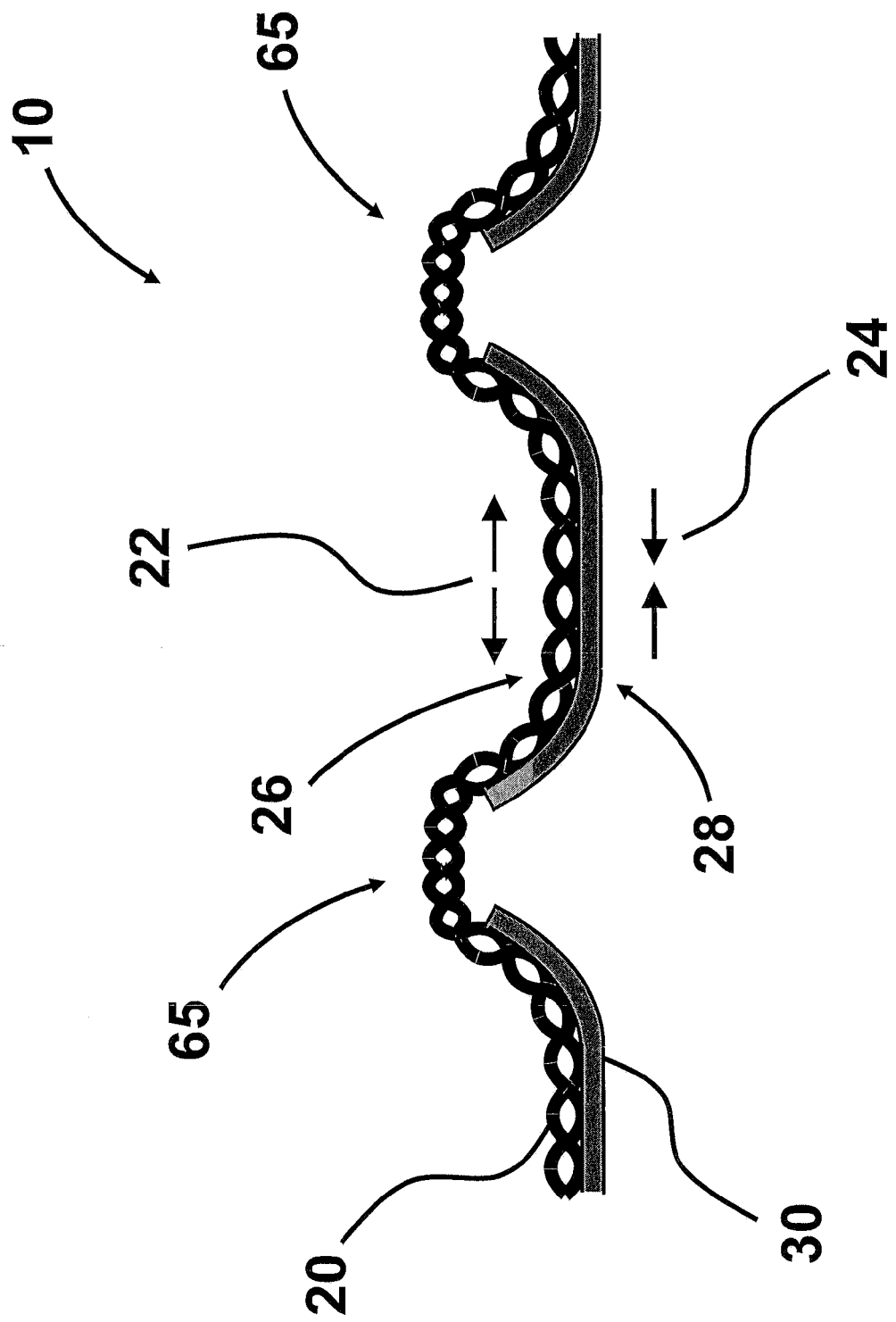
FIG. 2A is a schematic illustration of the multi-layered article of FIG. 2 depicting the compression and tension forces.

The adhesive 30 is applied to the first textile 20 in a discontinuous pattern such that the adhesive 30 contains adhesive regions 50 separated by non-adhesive regions 60. The adhesive 30 may be applied as a series of discontinuous dots, such as shown in FIG. 1, or may be applied in a solid, continuous pattern within the adhesive regions 50 as depicted in FIG. 2. Also, the adhesive dots may be distributed non-uniformly within the adhesive regions. "Non-uniform" as used herein it is meant to describe that the dots, the adhesive, the pattern, or other item is distributed in a random or variable manner. The adhesive dots within the adhesive regions 50 may have the same or substantially the same size or may vary in size within one adhesive region or from one adhesive region to another. The adhesive 30 may be breathable or non-breathable and can be applied to the first textile 20 by any conventional manner, such as, but not limited to, gravure printing, screen printing, and transfer printing. Additionally, the adhesive may optionally be a fire resistant adhesive or contain a fire resistant or retardant material to provide fire retardancy to the multi-layered article. Non-limiting examples of fire resistant or retardant materials include, for example, aramids, polybenzimidazole (PBI), poly p-phenylene-2,6-bezobisoxazole (PBO), modacrylic blends, polyamines, flame resistant rayon, polyamines, carbon, polyacrylonitrile (PAN), and blends and combinations thereof.

The adhesive 30 is also applied to the first textile 20 such that the adhesive regions 50, together with the non-adhesive regions 60, create a visible pattern on the surface of the multi-layered article 10. It is to be appreciated that the pattern formed by the adhesive and non-adhesive regions 50, 60, respectively can have any geometric (e.g., square, circular, rectagonal, octagonal, etc.) or abstract shape, and is generally repeated two or more times. Additionally, one or more geometric or abstract shape may be utilized to form the visible pattern. In addition, the non-adhesive regions 60 are free or substantially free of adhesive. Further, these non-adhesive regions 60 may form a continuous path within the multi-layered article 10 that is free or substantially free of adhesive.

Figure 3:
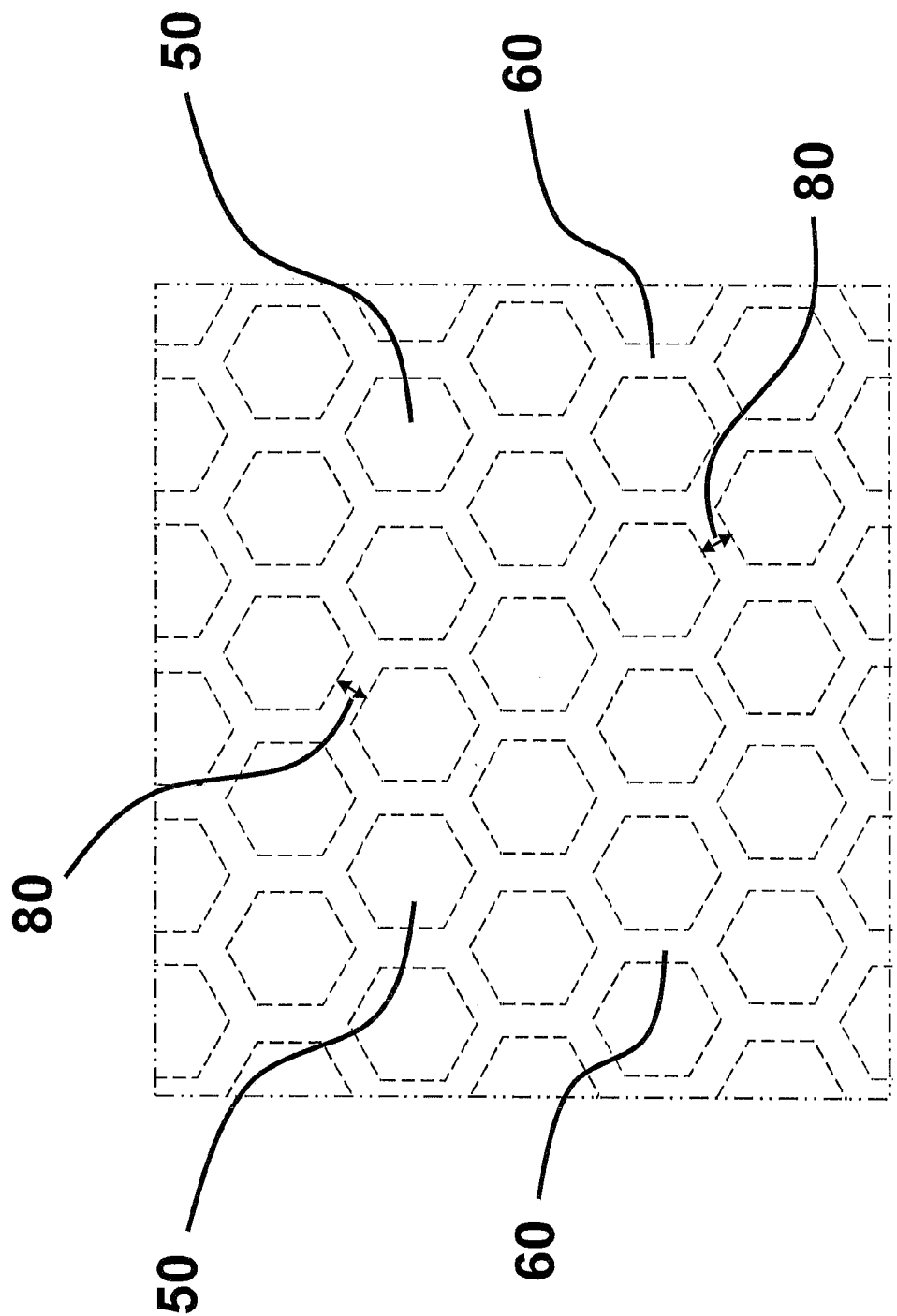
FIG. 3 is a top view of the multi-layered article of FIG. 1 or 2 illustrating a pattern formed by the adhesive and non-adhesive regions according to one embodiment of the invention.
Figure 9:
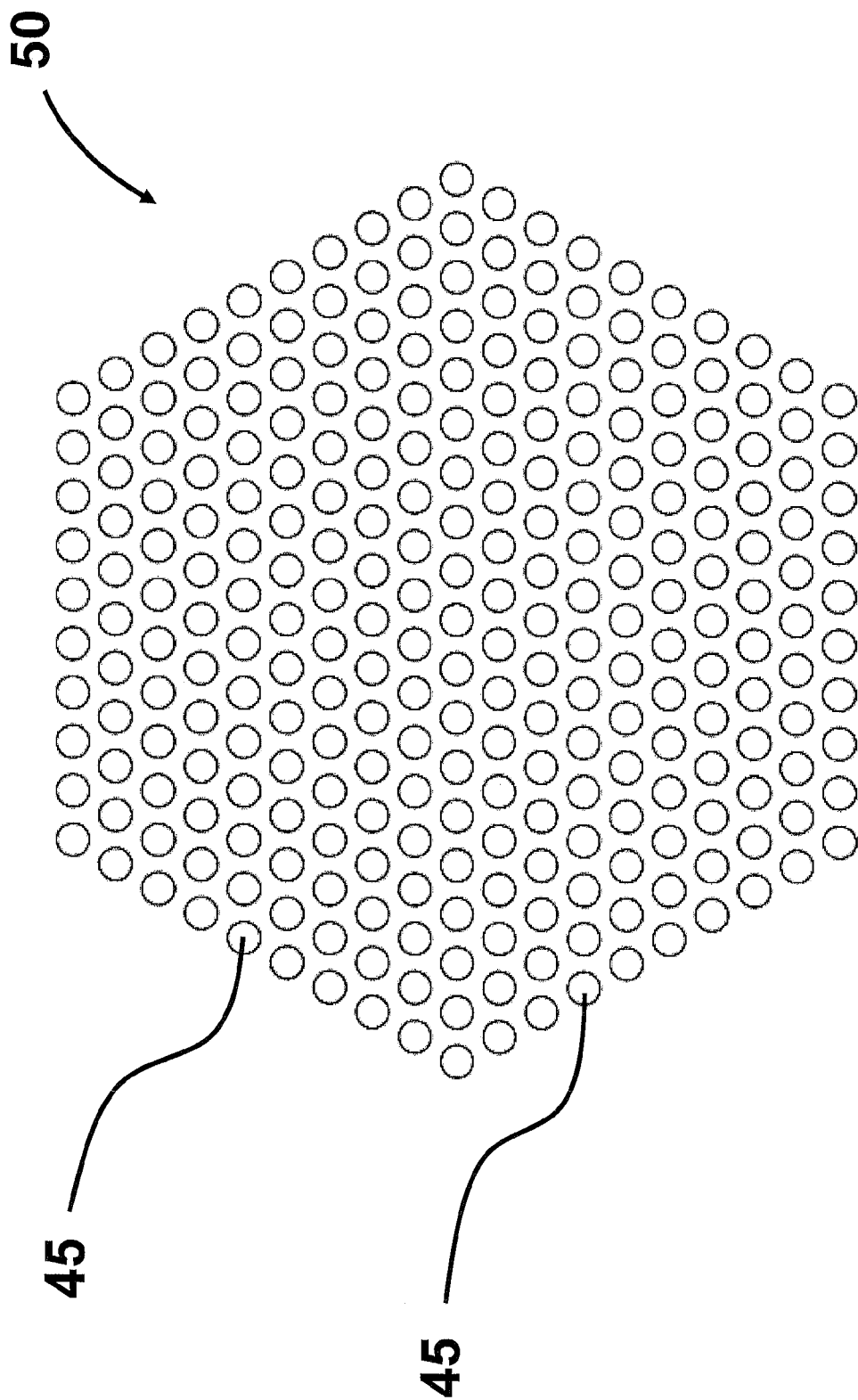
FIG. 9 is a schematic illustration of an exemplary adhesive region where the adhesive dots have substantially the same diameter throughout the adhesive region.
Figure 10:
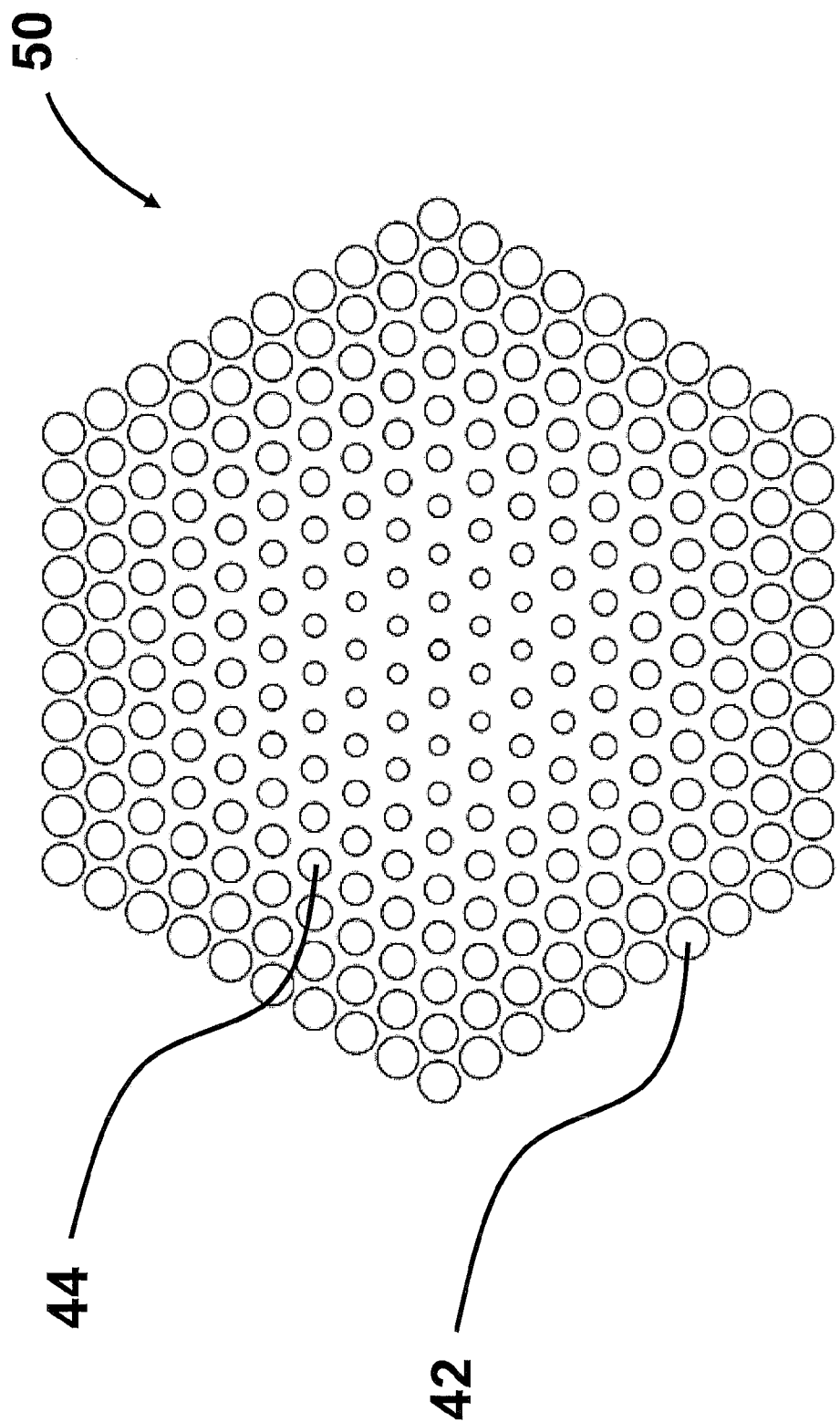
FIG. 10 is a schematic illustration of an exemplary adhesive region where the adhesive dots positioned on the outer portion of the adhesive region have a diameter that is larger than adhesive dots positioned in an inner portion of the adhesive region.

FIG. 3 illustrates a top view of an exemplary embodiment where the adhesive regions 50 and non-adhesive regions 60 form a visible hexagonal pattern on the exterior surface of the first textile 20 of the multi-layered article 10 (such as is shown in FIGS. 1 and 2). For example, adhesive dots 45 forming the hexagonal pattern may have substantially the same diameter throughout the adhesive region 50, such as is illustrated in FIG. 9. The distance between adjacent adhesive dots 45 within the adhesive regions 50 may be less than a distance between consecutive adhesive regions 50. Alternatively, the adhesive dots positioned on the outer portion of the adhesive region 50 may have a diameter that is larger than adhesive dots positioned in an inner portion of the adhesive region 50. Looking at FIG. 10, it can be seen that the adhesive dots 42 have a larger diameter than adhesive dots 44. Additionally, as shown in FIG. 10, the adhesive dots may get sequentially smaller in diameter from the outer portion of the adhesive region 50 to the inner portion of the adhesive region 50. Further, the distance between dots 42, 44 may vary within the adhesive region 50 (not illustrated).

Figure 11:
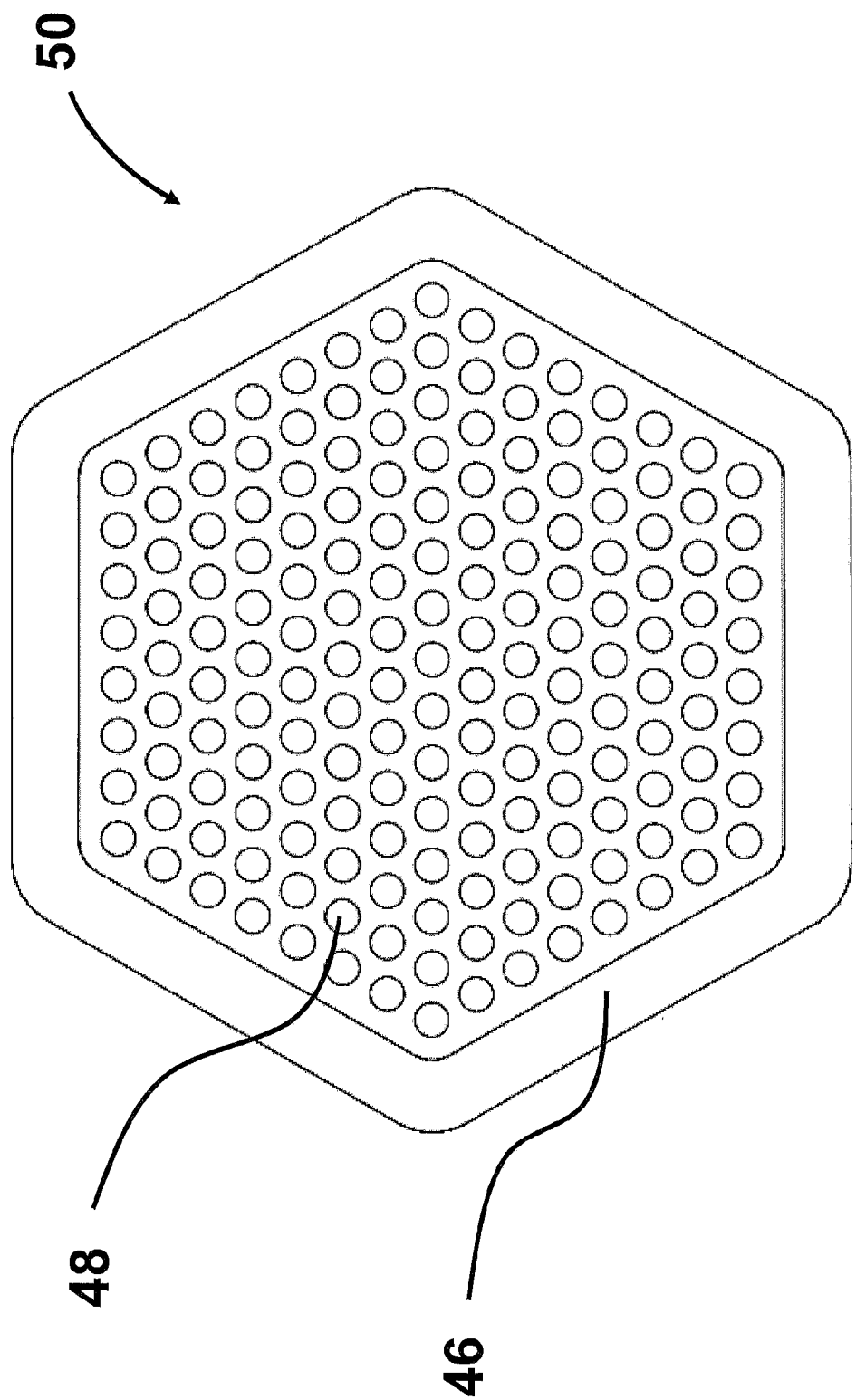
FIG. 11 is a schematic illustration of an exemplary adhesive region where an outer portion of the adhesive region is formed of a continuous or substantially continuous band of adhesive surrounding a plurality of adhesive dots having substantially the same diameter.

In other embodiments, the adhesive 30 may be applied in both a continuous and discontinuous manner within the adhesive region 50. One such example is shown in FIG. 11 where an outer portion of the adhesive region 50 is formed of a continuous or substantially continuous band of adhesive 46 surrounding a plurality of adhesive dots 48 having substantially the same diameter. It is to be appreciated that the adhesive dots 48 located within the band of adhesive 46 may vary in diameter, may themselves form a distinctive pattern, or may sequentially get larger or smaller in diameter moving towards the center of the adhesive region 50, and that such embodiments are considered within the purview of the invention.

Figure 12:
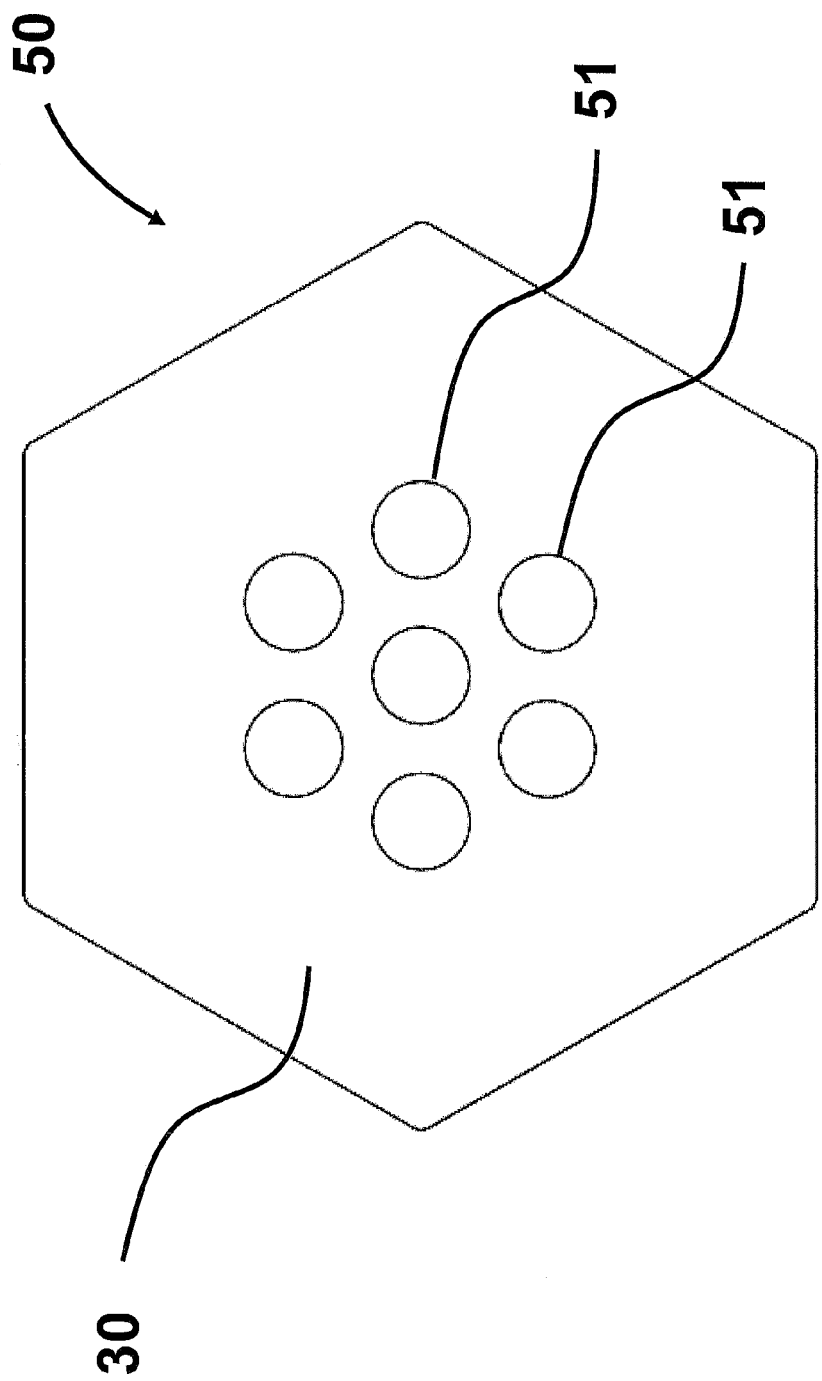
FIG. 12 is a schematic illustration of an exemplary adhesive region where the adhesive is applied in a manner so as to form centrally located circular regions that are free or substantially free of adhesive.
Figure 13:
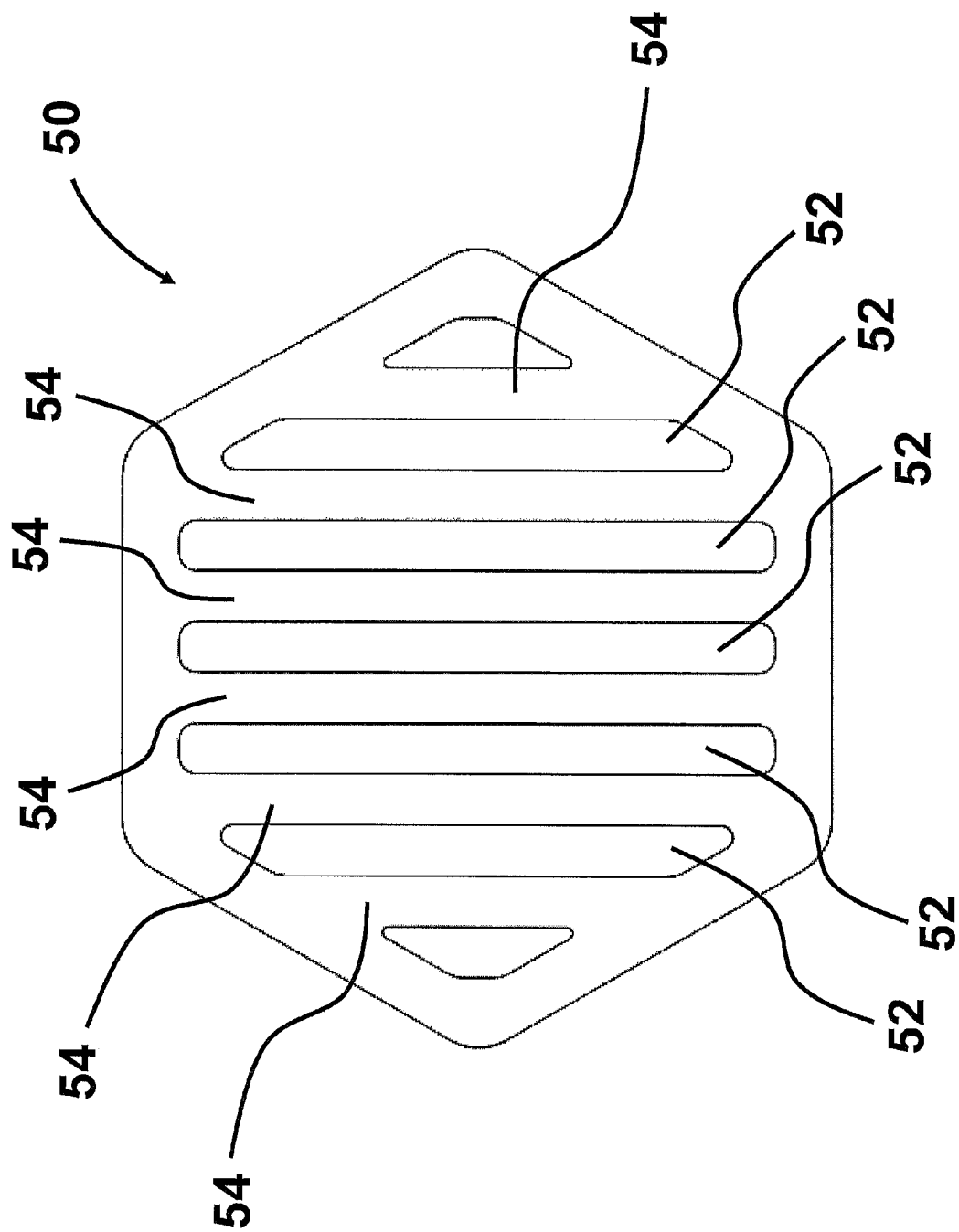
FIG. 13 is a schematic illustration of an exemplary adhesive region where the adhesive 30 is applied to form a grid-like pattern within the adhesive region.

In other embodiments, the adhesive 30 may be applied to form a pattern within the adhesive region 50. In FIG. 12, an adhesive 30 is applied in a manner so as to form centrally located circular regions 51 that are free or substantially free of adhesive. Although only seven circular regions 51 are illustrated in FIG. 12, it is to be understood that fewer or more circular regions 51 may be present. It is also to be understood that the regions do not have to be circular in nature and that adhesive free regions in the adhesive region 50 may have any shape. In another exemplary embodiment, the adhesive 30 may be applied to form a grid-like pattern, such as is depicted in FIG. 13. More specifically, strips of adhesive 54 are positioned within the adhesive region 50 such that the strips 54 are substantially parallel to each other with non-adhesive regions 52 interspacing the adhesive strips 54. It is to be appreciated that additional strips of adhesive crossing strips 54 in a substantially perpendicular orientation to form a "grid" (not illustrated) is also considered to be within the scope of the invention.

It is to be understood that the patterns of adhesive within the adhesive regions 50 depicted in FIGS. 9-13 are merely exemplary in nature and that other adhesive and/or non-adhesive patterns within the adhesive region 50 are considered to be within the scope of the invention. It is also to be understood that the adhesive may be distributed uniformly or non-uniformly within the adhesive region(s) in any pattern within the adhesive region 50.

In at least the example depicted in FIG. 3, the adhesive regions 50 are separated by the non-adhesive regions 60 by a distance represented by double sided arrow 80. This unbonded distance may be greater than about 1.5 mm, and in exemplary embodiments, may range from about 1.5 mm to about 20 cm, from about 1.5 mm to about 10 cm, from about 1.5 mm to 20 mm, or from about 1.5 mm to about 10 mm. Also, the adhesive regions 50 may have a width of at least 2 mm, 3 mm, 4 mm, 5 mm, 7 mm, or 10 mm or more. In exemplary embodiments, the width of the adhesive regions is from about 3 mm to about 10 cm or from about 3 mm to about 50 mm. As used herein, the "width" is generally defined as the greatest distance from one side of the adhesive region 50 to the other.

It is to be appreciated that the adhesive and non-adhesive regions 50, 60, respectively, can vary in size depending on the desired physical appearance and attributes. In one or more exemplary embodiment, the width of the adhesive region 50 is greater than the width of the non-adhesive region 60. Additionally, the percent area coverage of the adhesive regions in the multi-layered article may represent greater than or equal to at least 30%, at least 40%, or at least 50% of the area of the article, and in some embodiments, greater than or equal to about 60% or 70% or greater. As used herein, the term "percent area coverage of the adhesive regions" is defined as the total two-dimensional area of adhesive regions within the multi-layered article divided by the total area of the multi-layered article, multiplied by 100%. In any event, the amount of adhesive present in the adhesive regions 50 is greater than the amount of adhesive present in the non-adhesive regions 60. In exemplary embodiments, the amount of adhesive (e.g., mass or volume of adhesive) present in the adhesive regions 50 is at least 10% greater, 20% greater, or even 30% greater (or more) than the amount of adhesive present in the non-adhesive regions 60.

Figure 4:
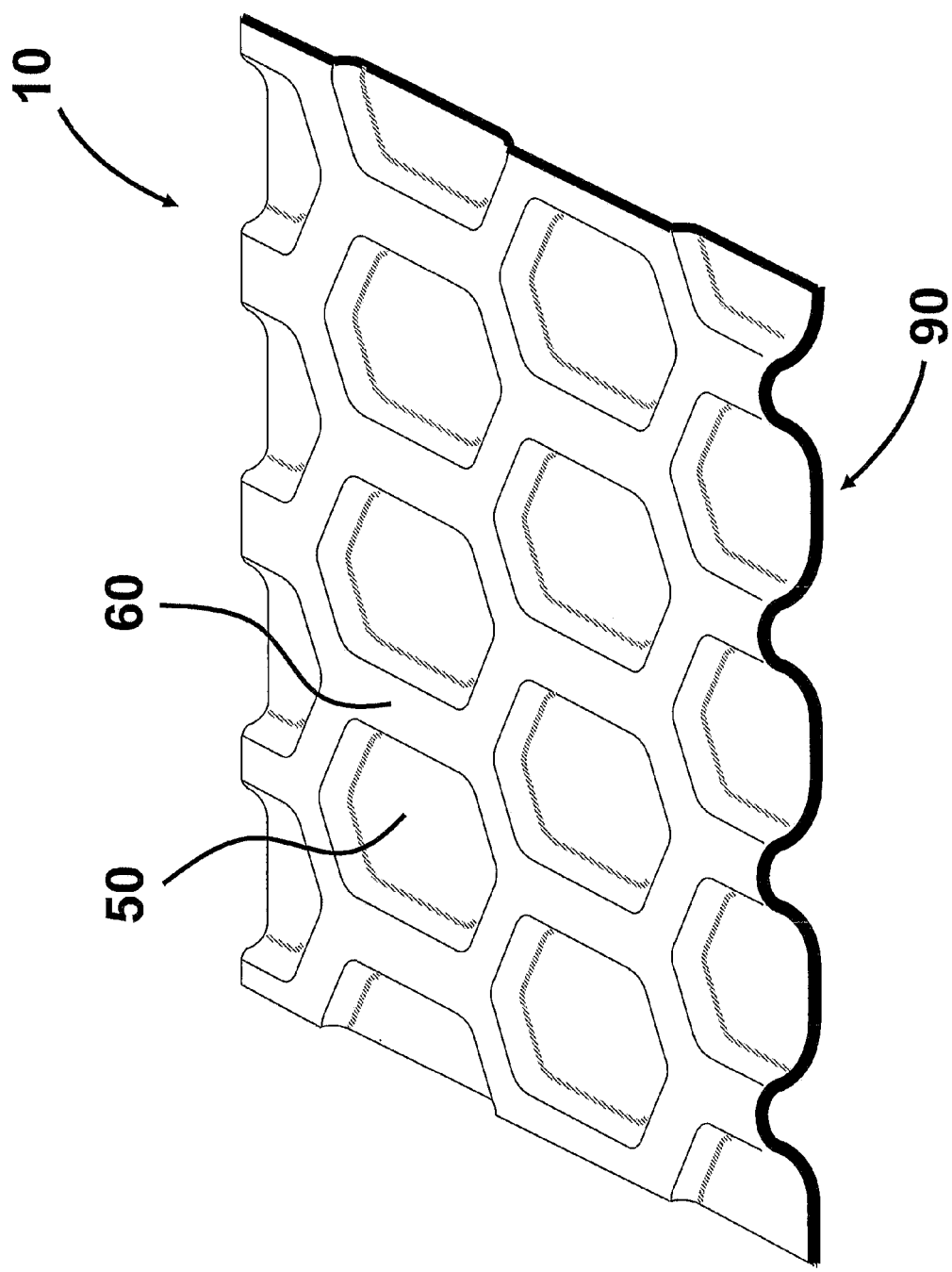
FIG. 4 is a perspective view of a three-dimensional multi-layered article according to at least one exemplary embodiment of the invention.

In one or more exemplary embodiment, the first textile 20 and/or the adhesive 30 is elastic or can otherwise be manipulated to change dimensions (e.g., shrink or elongate). In the instance where the first textile 20 is elastic, raised, visible portions of the multi-layered article corresponding to the non-adhesive regions 60 are visible as depicted in FIG. 4. The raised, visible pattern outlines the geometric or abstract shape formed by the adhesive. In addition, the adhesive regions 50 exhibit a localized curling phenomenon 90. It was unexpectedly discovered that the non-adhesive regions 60 not only relieve the residual stresses in the article, they also allow for the introduction of stress (e.g., curl) in the adhesive regions 50 without causing excessive curl in the overall article 10. The localized, aggressive curl 90 in the adhesive regions 50, separated by flexible non-adhesive regions 60, increases the three-dimensional aspect of the multi-layered article 10 and introduces increased performance and/or characteristics, such as, but not limited to stretch and aesthetic characteristics.

In addition, the radius of curvature of the adhesive regions 50 may be greater than about 1 mm, greater than about 2 mm, greater than about 3 mm or even greater. In exemplary embodiments, the radius of curvature ranges from about 1 mm to about 20 mm, from about 3 mm to about 12 mm, or from about 4 mm to about 8 mm. Also, the multi-layered article may have a thickness to weight per unit area greater than about 0.005 mm/(g/m$^2$), greater than about 0.010 mm/(g/m$^2$), or greater.

The multi-layered articles of the present invention further exhibit a surprisingly low stretch force, as measured and described later herein, relative to the stretch force required to stretch the first textile alone. For comparison purposes, conventional uniformly coated materials promoted as having stretch properties can typically exhibit stretch forces on the order of at least 5 times (5×) greater than the stretch force of the first textile alone. The novel multi-layered articles of the present invention may exhibit stretch forces which are on the order of only three times (3×) or less greater than the stretch force of the first textile alone. In an alternative embodiment, discontinuously coated articles of the present invention may exhibit stretch forces which are on the order of only 2 times (2×) or less greater than the stretch force of the first textile alone. Alternatively, embodiments of the multi-layered articles of the present invention may exhibit stretch forces which are substantially the same as (1×) or even less than the stretch force of the first textile alone. In even further alternative embodiments, stretch forces for the discontinuously coated multi-layered article may be on the order of one half (0.5×) or less of the stretch force required to stretch the first textile alone. In other alternative embodiments, the stretch force may be on the order of one third (0.33×) or less of the stretch force required to stretch the first textile alone. Other embodiments of the present invention may exhibit stretch forces on the order of one fifth (0.20×) or less of the stretch force required to stretch the first textile alone.

To form the multi-layered article 10 according to one exemplary embodiment, the first textile 20 is stretched a predetermined distance and adhesive 30 is applied to the first textile 20 in a stretched state. It is to be understood that although the first textile 20 (and adhesive 30 discussed below) is discussed herein as being stretched in one direction, bi-axially stretching the textile (and adhesive) is considered to be within the scope of the invention. Upon the release of tension, the first textile 20 returns to approximately its original, unstretched position. In exemplary embodiments, adhesive 30 is cured prior to the release of tension.

As the first textile 20 relaxes ("unstretches"), the adhesive regions 50 curl and the non-adhesive regions 60 rise. The multi-layered article 10 buckles (e.g., bunches) in the non-adhesive regions 60 due, at least in part, to the absence or substantial absence of adhesive in the non-adhesive regions 60 compared to the adhesive regions 50. The terms "buckle" and "bunch" may be used interchangeably herein and are meant to denote the bending of the textile layer 20 upon itself to form the raised portions 65. As depicted in FIGS. 1, 2, 2A, 5, and 5A, the textile 20 in the adhesive regions 50 is stretched or lengthened compared to the textile 20 in the raised portions 65. The difference in the presence of adhesive in the adhesive regions 50 and the non-adhesive regions 60 permits the multi-layered article to rise (relax) in the non-adhesive regions 60 and curl in the adhesive regions 50, such as is shown in FIG. 1. It is to be noted that when the first textile 20 is stretchable, the concave surface of the adhesive regions 50 is positioned toward the textile side of the article. It is to be appreciated that the concave surface 26 in the adhesive region 50 of the multi-layered article 10 is under tension, which is depicted by arrows 22 in FIG. 2A. Also, the convex surface 28 is under a compressive force, as depicted by arrows 24. In contrast, the raised portion 65 is in a substantially relaxed, non-tensioned state. Such compression/tension of the convex/concave surfaces and the relaxed state of the raised portions within the multi-layered article is present in all embodiments described herein where the textile 20 is elastic, even though it may not be expressly stated.

Figure 5:
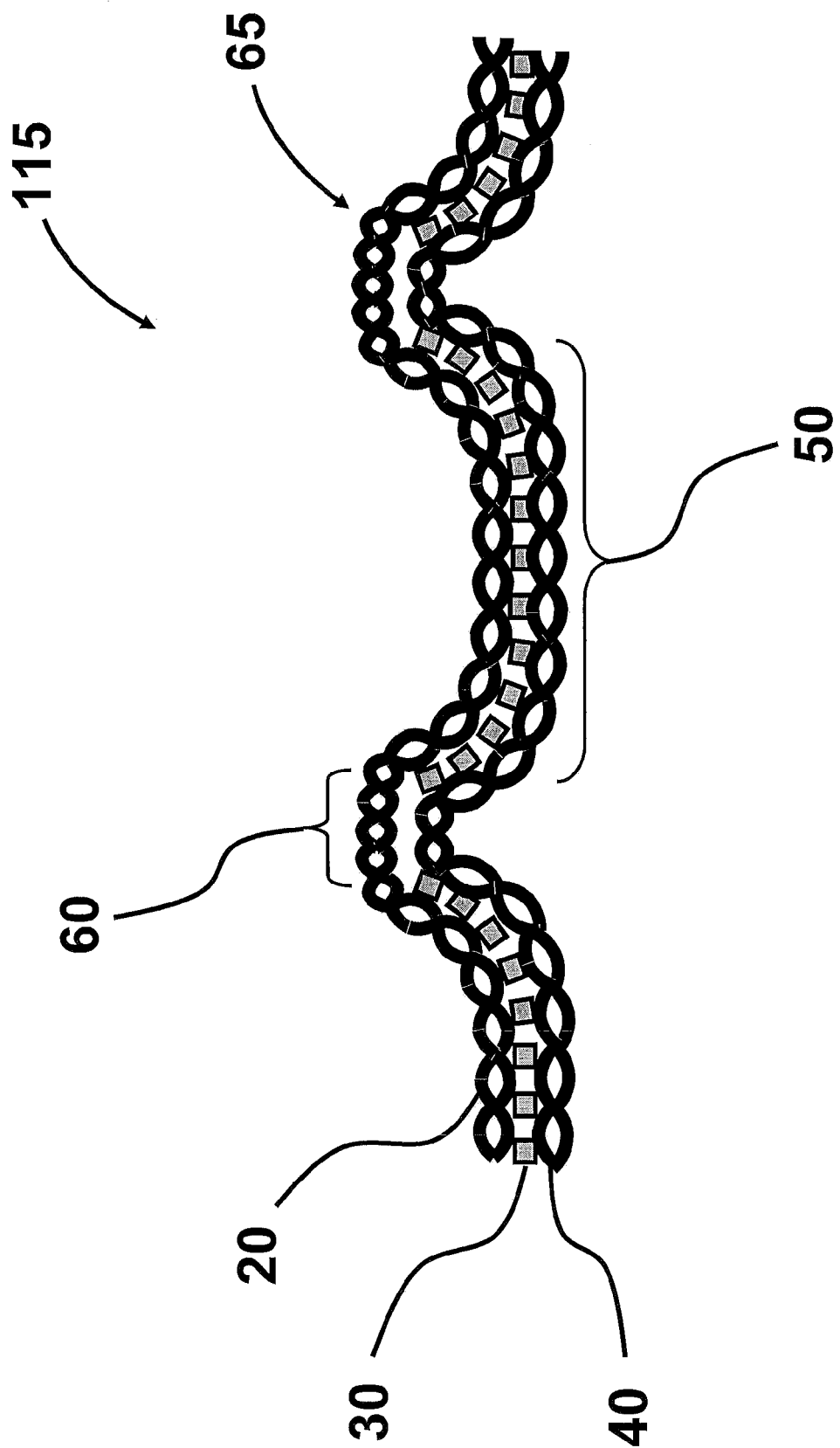
FIG. 5 is a schematic illustration of the multi-layered article of FIG. 1 where a second textile positioned on the adhesive layer substantially follows the contour of the first textile according to at least one exemplary embodiment of the invention.

A second textile 40 may be positioned on the adhesive 30 when the first textile 20 is in a tensioned (stretched) state. The second textile may be any of the textiles described above with reference to the first textile 20 and may be the same as or different from the first textile 20. As discussed above, as the first textile 20 relaxes, the adhesive regions 50 curl and the non-adhesive regions 60 rise. As illustrated in FIG. 5, the second textile 40 substantially follows the contour of the first textile 20 in the multi-layered article 115.

Figure 5A:
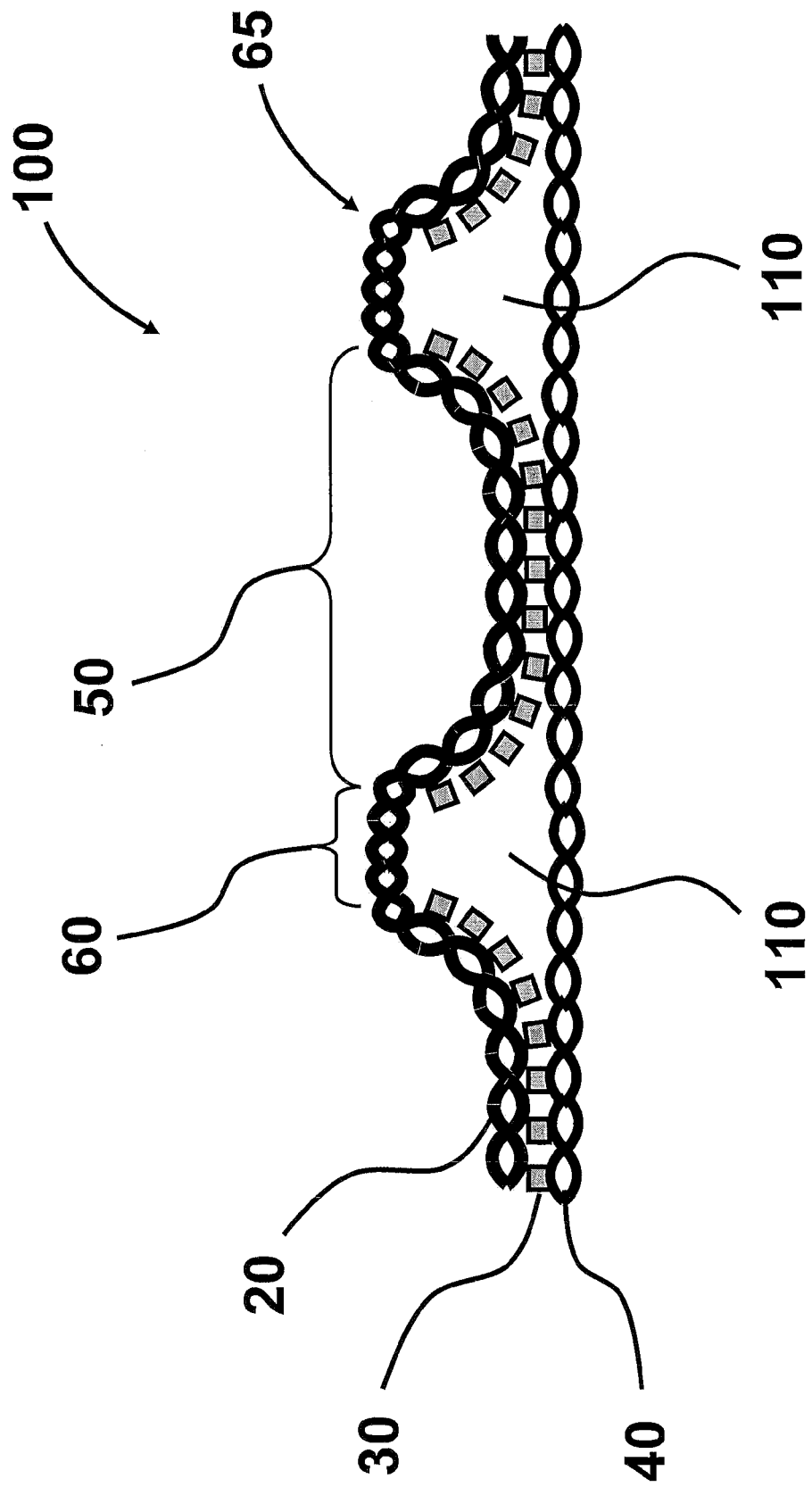
FIG. 5A is a schematic illustration of the multi-layered article of FIG. 1 where a second textile forms air pockets within the article according to at least one exemplary embodiment of the invention.

In at least one embodiment of the invention depicted in FIG. 5A, a second textile 40 is bonded to adhesive 30 on the side opposing the first textile 20 after the first textile 20 is released from tension and the article 100 has curled in the adhesive regions 50. As can be seen in FIG. 5A, the second textile 40 is substantially flat relative to the first textile 20. By affixing the second textile 40 to the adhesive 30 in this manner, air pockets 110 are formed in the areas defined between the first textile 20 and the second textile 40. These air pockets 110 provide insulation value to the multi-layered article 100. In addition, the raised portions 65 may be at least partially coated with an abrasion resistant coating, such as a polymer coating, (not illustrated) to protect the first textile 20 (e.g., outer surface) from wear, such as, for example, when the article is used to construct a garment.

In a further embodiment, the adhesive may be shrinkable. Looking at FIG. 6, the first textile 20 has thereon a continuous adhesive 30 within the bonded regions 50 that forms a patterned surface on the multi-layered article 120. In one exemplary embodiment where the adhesive 30 is shrinkable, raised portions corresponding to the adhesive regions 50 and curling in the adhesive regions 50 are achieved by applying adhesive 30 to the first textile 20 and curing the adhesive 30 such that the adhesive shrinks and curls the article in the adhesive regions 50 toward the adhesive 30. As the adhesive 30 shrinks, such as by applied heat, the article 120 curls in the adhesive regions 50 towards the adhesive 30, causing the adhesive regions to rise and form raised portions. In such an embodiment, the concave surface of the adhesive regions 50 is positioned towards the adhesive side of the article. As discussed above, the difference in the presence of adhesive in the adhesive regions 50 and the non-adhesive regions 60 allows the article to rise (relax) in the non-adhesive regions 60 and curl in the adhesive regions 50. In addition, the curled, raised areas corresponding to the adhesive regions 50 may be at least partially coated with an abrasion resistant coating, such as a polymer coating, (not illustrated) to protect the first textile 20 (e.g., outer surface) from wear, such as, for example, when the multi-layered article is used to construct a garment.

A second textile 40 may be affixed to the first textile 20 by the adhesive layer 30 prior to shrinking the adhesive 30 or the first textile 20. In such an embodiment, the second textile 40 substantially follows the contour of the first textile 20 as depicted by the multi-layered article 125 illustrated in FIG. 6A.

Figure 7:
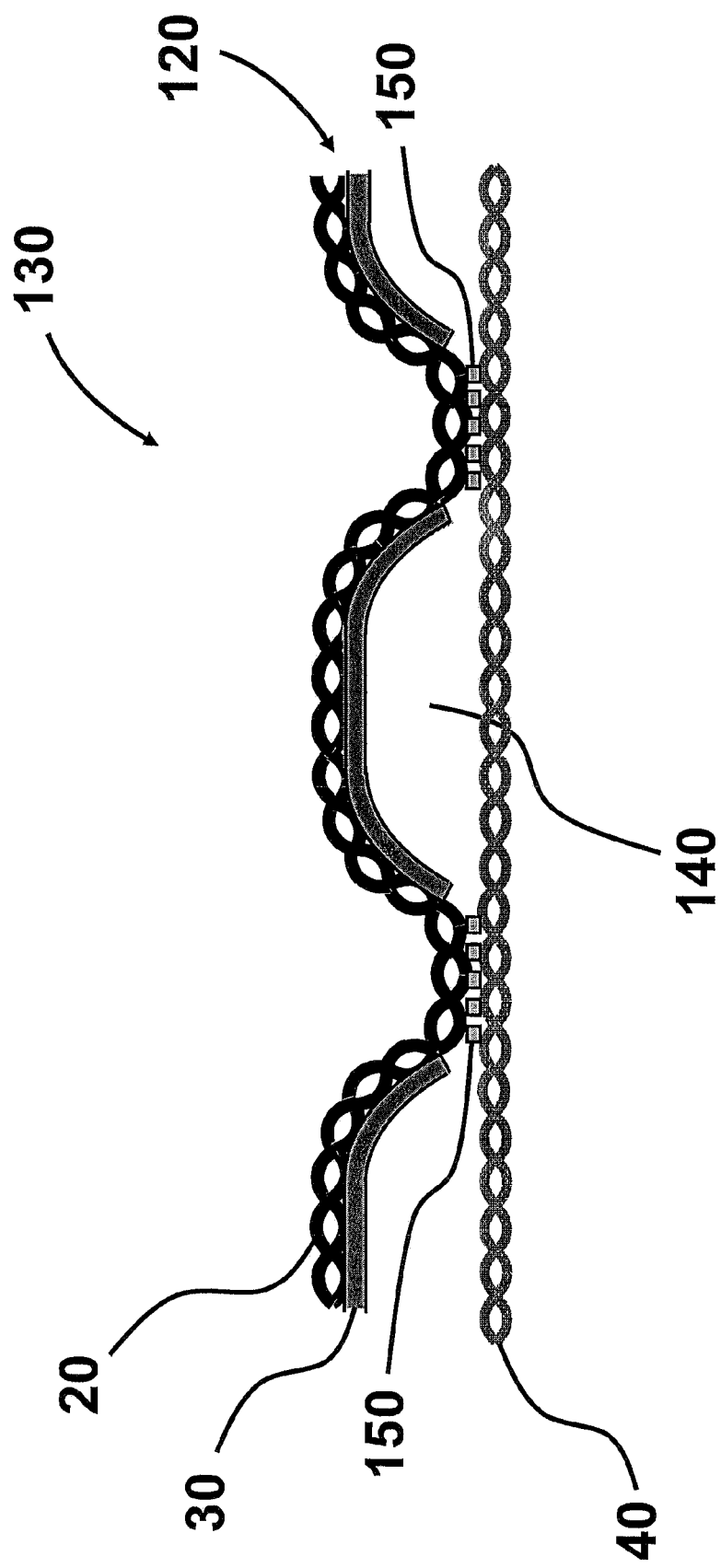
FIG. 7 is a schematic illustration of the multi-layered article of FIG. 6 with a second textile positioned on the adhesive opposite the first textile according to one embodiment of the invention.

Alternatively, a second textile 40 may be affixed to the first textile 20 by a second adhesive 150, such as is depicted in FIG. 7 to form the multi-layered article 130. It is to be appreciated that adhesive 150 may be applied in discrete, discontinuous portions on only the portion of the article 130 where the second textile 40 is in contact with the first textile 20 as shown. Alternatively, the adhesive 150 may be applied in continuous, discrete portions or it may be applied in a discontinuous manner across or substantially across the length of the second textile 40 (not illustrated). In the embodiment depicted in FIG. 7, the addition of the second textile 40 forms air pockets 140 in the areas defined between the second textile 40 and adhesive 30.

Alternatively, in an embodiment where the first textile 20 is shrinkable, the raised portions 65 in the unbonded regions 60 and the curling in the bonded regions 50 are achieved by shrinking the first textile layer 20, such as by applying heat to the first textile layer 20. As the textile layer 20 shrinks, the multi-layered article 120 curls in the bonded regions 50 toward the textile layer 20, resulting in a multi-layer article similar to that depicted in FIG. 1 or 2, depending on whether a continuous or discontinuous adhesive 30 is utilized. The multi-layered article relaxes (rises) in the unbonded regions 60 to relieve the stress caused from shrinking the textile layer 20. Here, the concave surface of the adhesive regions 50 is positioned towards the textile 20 side of the article.

Figure 6:
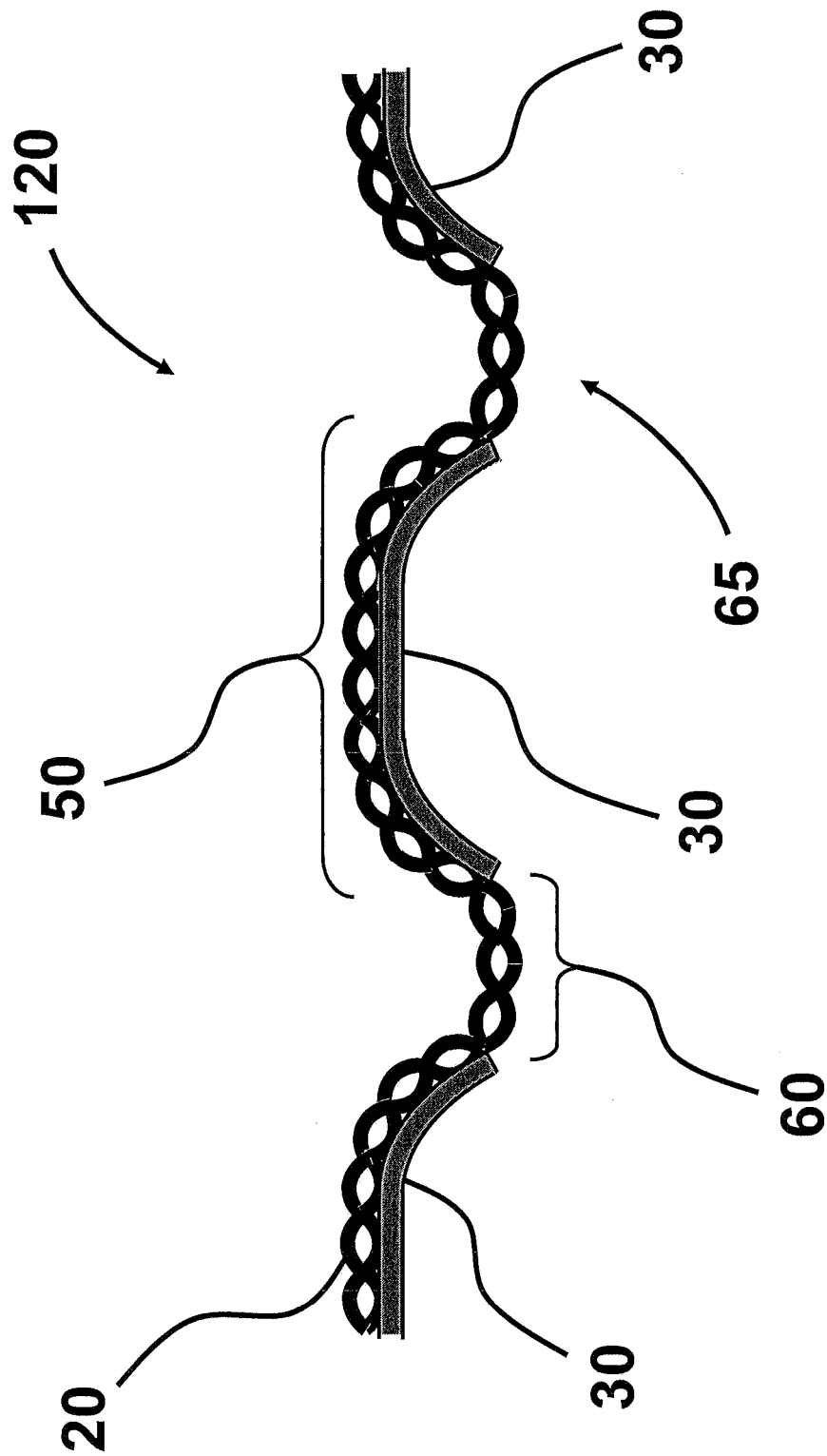
FIG. 6 is a schematic illustration of a multi-layered article formed with a shrinkable adhesive according to at least one exemplary embodiment of the invention.
Figure 6A:
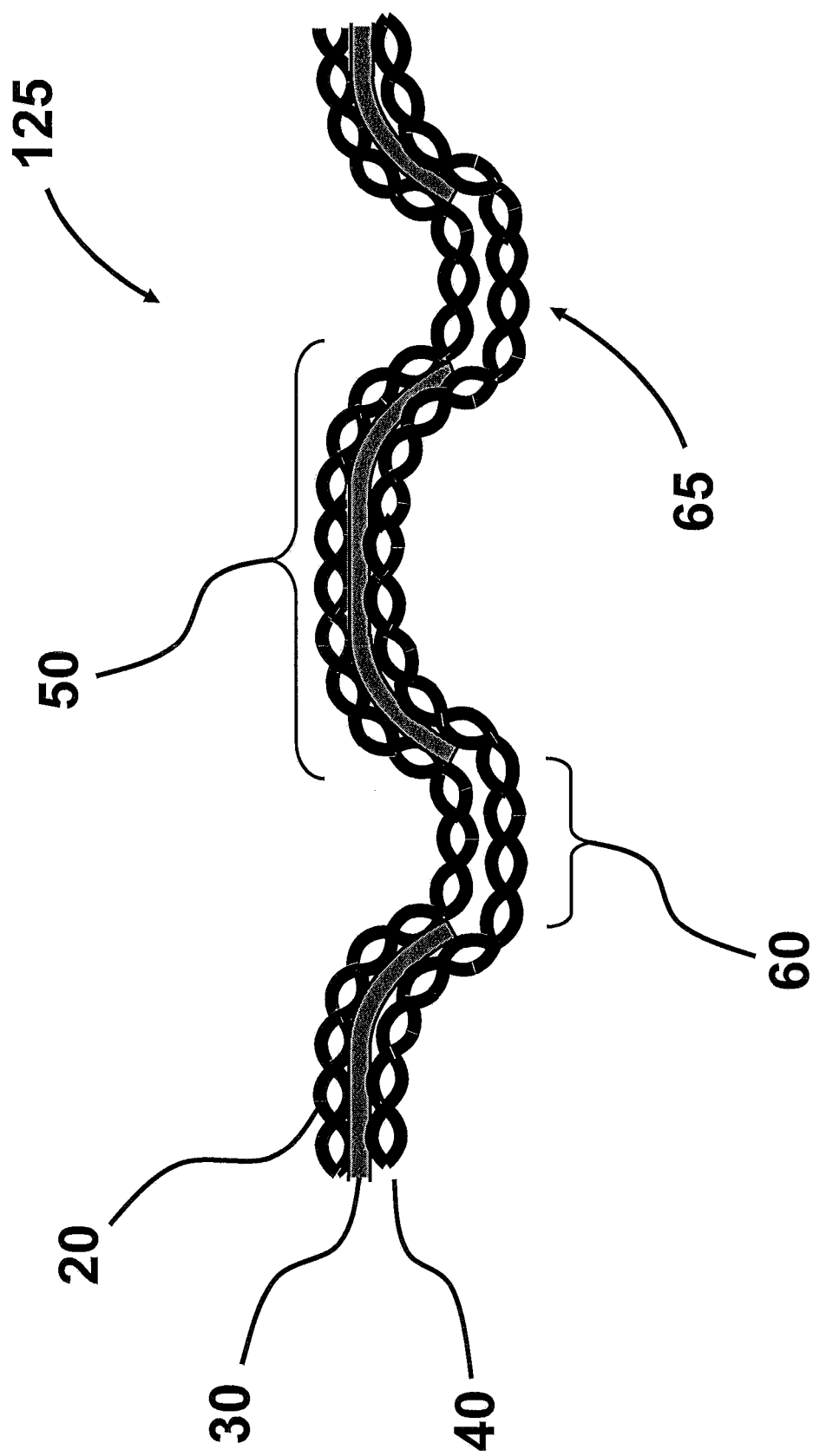
FIG. 6A is a schematic illustration of FIG. 6 where a second textile positioned on the adhesive layer substantially follows the contour of the first textile according to one embodiment of the invention.

It is to be understood that the embodiments depicted in FIGS. 6, 6A, and 7, where the textile or adhesive is shrinkable or the textile is stretchable, the adhesive 30 is typically applied in a continuous manner within the adhesive regions 50, although a discontinuous adhesive may be utilized.

It is to be appreciated that the above-described embodiments are non-limiting as the three-dimensional nature of the article may be achieved by providing at least one layer that is deformable in some manner, such as, for example, by being elastic, by being shrinkable, by being expandable, or any combination thereof. The deformation of one of the layers creates stress within the article that causes curling of the article within the adhesive regions. In turn, the non-adhesive regions allow the multi-layered article to buckle, which relieves the stress caused by the curling of the multi-layered article.

The multi-layered articles described herein may be used in a variety of applications, such as, for example, in garments (e.g., jackets, pants, etc.) for stretchability for comfort, ease of movement, and for ease of donning and doffing, as insulation, as spacer material, to enhance air circulation, in diffuse reflective surfaces, or anywhere else that a highly texturized and/or stretchable article may be used. The advantages of the invention as described herein are numerous, ranging from increased surface texture to improved stretch properties. Articles having increased surface texture may be used in applications where fabric spacing is important such as in stand-off applications for increasing insulation or improving airflow, or where a reduction in specular reflection is desired. Embodiments which utilize the fabric spacing properties include light-weight insulative garments for consumers, firefighters, and the like, or improved ventilation materials for back packs or garments. Embodiments which utilize the improved stretch properties include active outdoor garments, athletic garments, or any other applications where fit and freedom of movement are valued.

Test Methods

It should be understood that although certain methods and equipment are described below, any method or equipment determined suitable by one of ordinary skill in the art may be utilized.

Thermal Conductivity Measurement

Thermal conductivity of samples of the present invention was measured using a custom-made heat flow meter thermal conductivity tester at atmospheric conditions (about 298 K and 101.3 kPa). The tester consisted of a heated aluminum plate with a heat flow sensor (Model FR-025-TH44033, commercially available from Concept Engineering, Old Saybrook, Conn.) and a temperature sensor (thermistor) imbedded in its surface, and a second aluminum plate maintained at room temperature, also with a temperature sensor imbedded in its surface.

The temperature of the heated plate was maintained at 309.15 K while the temperature of the "cold" plate was kept at 298.15 K. The heat flow measurement (in W/m 2 K) was taken between two layers of thin aluminum foil (approximately 0.02 mm thick), which covered the plates of the conductivity tester. The diameter of the plates was about 10 cm. The thickness of the samples was measured using a digital micrometer (Model XLI 40002, Mahr Federal Inc., Providence, R.I.) between two rigid surfaces with an area of 5 cm$^2$. The heat flow measurement was normally obtained within about two to five minutes after the sample was placed in the tester upon reaching a steady state.

Thermal resistance per unit mass was calculated from the measured heat flow and the sample weight according to the formula $R_m=(1/Q-1/Q(0))/w$, where $R_m$ is thermal resistance per unit mass in $(m^2K/W)/(kg/m^2)$, Q is heat flow in $W/m^2K$, Q(0) is heat flow with no sample in place ($Q(0)=100 W/m^2K$), and w is sample weight in $kg/m^2$. The reported values represent the average of three measurements.

Radius of Curvature Measurement

Figure 8:
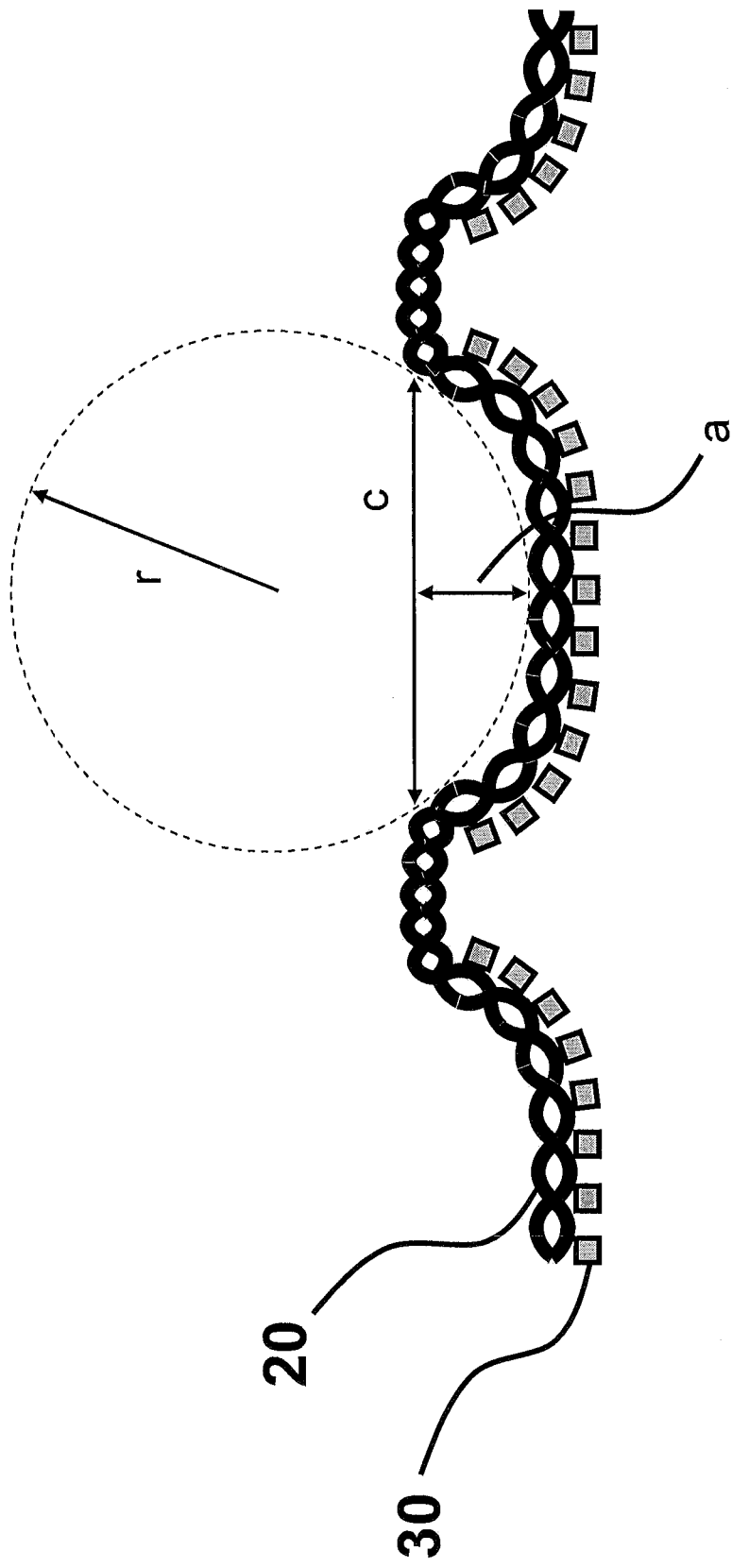
FIG. 8 is a schematic illustration of a method for determining the radius of curvature of the multi-layered article of FIG. 1.

The radius of curvature is defined as the radius of the largest circle that can touch both the top edges and the bottom center of a cross-section of a curled region, as shown in FIG. 8. To determine this, the sample was cut perpendicular to the radius of curvature such that the cut bisected several curled sections. The width and the depth of the curled sections were then measured with digital calipers and average values were obtained.

The radius of curvature was calculated from the average width and depth measurements according to the formula: $r=c^2/(8*a)+(a/2)$, where r is the radius of curvature in mm, c is the width of the curled section in mm and a is the depth of the curled section in mm. The reported values were the average of three measurements.

Bending Modulus Measurement

The bending modulus of a 4.68 mm×4.68 mm sample of multi-layered article of the present invention was measured using a Thermomechanical Analyzer (Model Q400 from TA Instruments, New Castle, Del.) using a 3-point bend method. The test was performed at 23° C. The support span was 2.508 mm. The deflection rate was approximately 0.162 mm per minute. The samples were placed in the test apparatus with the face fabric facing up.

The modulus of each sample was calculated according to the formula $E_f=L^3 m/(4bd^3)$, where $E_f$ is the bending modulus in MPa, L is the support span in mm, m is the slope of the initial straight-line portion of the load-deflection curve in N/mm, b is the width of the test sample in mm, and d is the thickness of the test sample in mm. Sample thickness was measured using a digital micrometer (Model ID-C112EX from Mitutoyo Corp, Kawasaki, Japan).

Six samples from each region were tested, three in the machine (warp) direction and three in the transverse (weft) direction. The reported values represent the average of all six measurements.

Thickness to Weight Per Area Ratio Measurement

The thickness of the samples was measured using a digital micrometer (Model XLI 40002, Mahr Federal Inc., Providence, R.I.) between two rigid surfaces with an area of 5 cm$^2$. It is to be noted that any suitable means for measuring the thickness and area can be used. The sample weight was determined by cutting a circular portion of the sample 8.9 cm in diameter and weighing it to the nearest 0.001 g. The thickness to weight ratio was calculated according to the equation D=T/(W/A), where D is the thickness to weight ratio in $mm/(g/m^2)$, T is sample thickness in mm, W is sample weight in g, and A is the area in $m^2$.

Stretch Force Measurement

The force to stretch of the samples was measured using an Instron universal testing machine (Model 5565) with a 1000-lb load cell. A 3-inch by 8-inch sample of material was cut with the long dimension oriented in the direction of maximum stretch. A horizontal bar 5 mm in diameter was attached to the load cell of the Instron and pneumatic clamps were attached to the Instron base. The top edge of the horizontal bar was positioned 3" above the top of the pneumatic clamp grips. The sample was folded in half parallel to the 3-inch sides and was placed over the horizontal bar. The ends of the sample were clamped together in the pneumatic clamp grips such that there was neither tension nor slack in the sample. The sample was stretched at a strain rate of 10 inches/minute and the load at 20% strain was recorded in lbf. The reported values represent the average of three measurements.

It would be apparent to one of skill in the art that the laminate may be separated into its component parts by any suitable means, which may include, but is not limited to, dissolving the adhesive with an appropriate solvent. The stretch force of the textile may then be determined. Furthermore, any suitable means for measuring the stretch force can be used provided that the strain rate remains the same, i.e., (10 inches/min)/(3 inch)×100%=333%/min.

Having generally described this invention, a further understanding can be obtained by reference to certain specific examples illustrated below which are provided for purposes of illustration only and are not intended to be all inclusive or limiting unless otherwise specified.

EXAMPLES

Example 1

A length of 129 g/m$^2$ nylon/Roica® stretch woven material (Style GNS3 from Formosa Taffeta Co., Touliu, Taiwan) and a length of polyurethane sheet adhesive were obtained. The sheet adhesive had a thickness of 0.18 mm.

Figure 14:
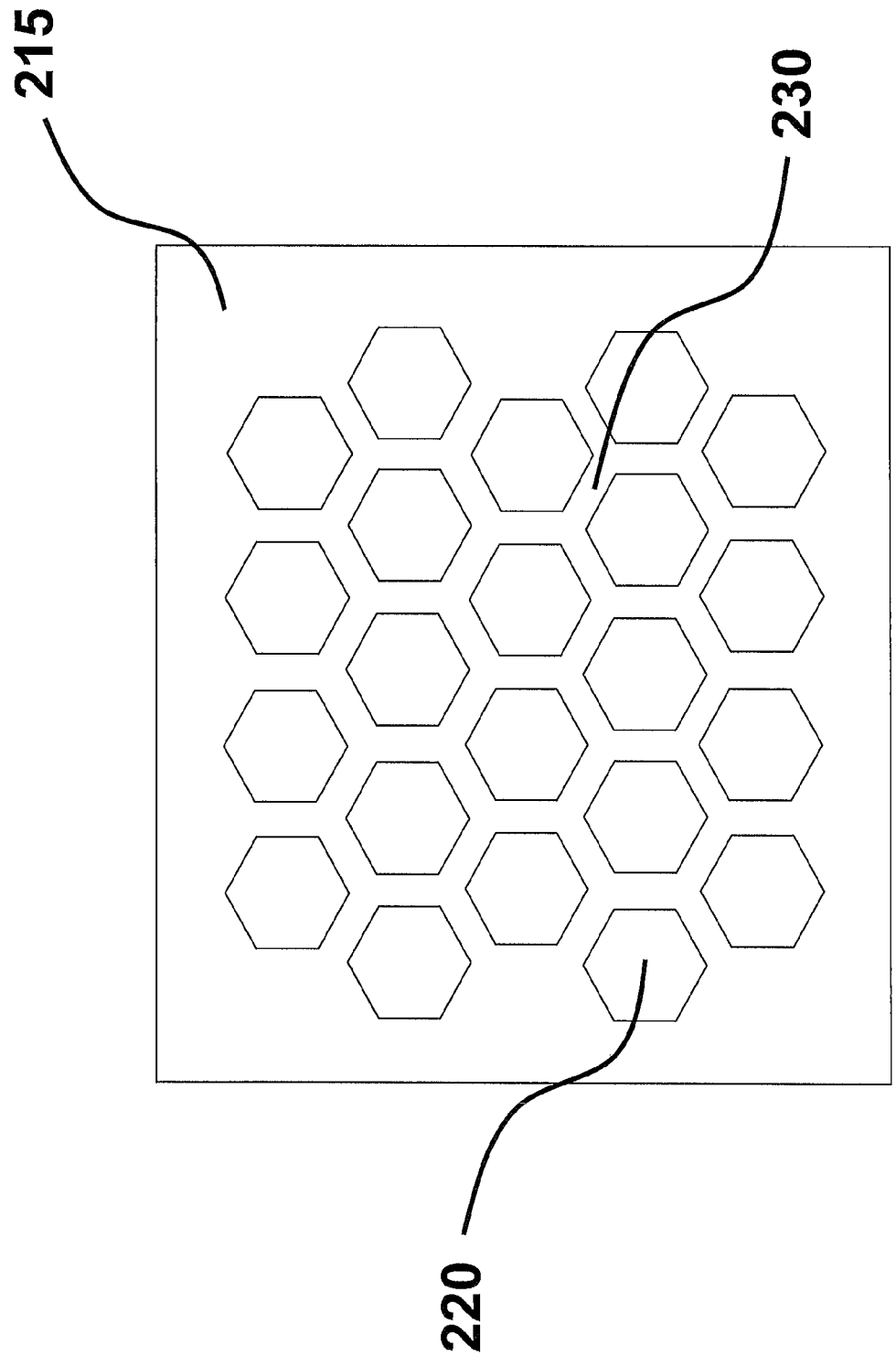
FIG. 14 is a schematic illustration of a release paper having therein a hexagonal pattern according to one exemplary embodiment of the invention.

A release paper 215 was laser cut using the honeycomb (hexagonal) pattern shown in FIG. 14. The hexagonal voids 220 were cut 10 mm wide and were separated by strips of release paper 230 4 mm wide. The stretch woven material was stretched across a 20.3 cm×15.2 cm flat plate in both the crossweb and downweb directions and held in place. The release paper 215 was placed on top of the stretch woven and the sheet adhesive was then placed onto the release paper 215. This setup was then placed in a heated press and pressed for ten seconds at 163° C. The setup was then removed from the heated press and the release paper was immediately removed from the textile while the sheet adhesive was still molten. This resulted in the sheet adhesive remaining adhered to the stretch woven material only in the areas corresponding to the voids in the release paper. The sheet adhesive was allowed to cool at room temperature for two minutes, at which point the stretch woven material was removed from the flat plate and allowed to relax, thereby returning to its initial, untensioned state. The sample exhibited localized curling in the areas corresponding to the hexagonal voids in the release paper. The concave surface of these areas was towards the textile side of the construct. The hexagonal pattern was visible by the naked eye.

The radius of curvature of the curled sections was 5.7 mm. The resulting multi-layered article weighed 242 g/m². The thermal resistance per unit mass of the multi-layered article was 0.032 (m²K/W)/(kg/m²). The thickness to weight per area ratio of the sample was 0.0040 mm/(g/m²).

Example 2

A length of polyurethane-coated ePTFE, was obtained. The ePTFE had the following properties: thickness=0.043 mm, density=0.41 g/cc, matrix tensile strength in the length direction=31×10⁶ MPa, matrix tensile strength in the width direction=93×10⁶ MPa, Bubble Point=1.5×10⁵ MPa. The available ePTFE contained an unnecessary layer of polyurethane.

A release paper 215 was laser cut using the honeycomb (hexagonal) pattern shown in FIG. 14. The hexagonal voids 220 were cut 10 mm wide and were separated by 4 mm wide strips 230 of release paper. The release paper was positioned onto the ePTFE side of the coated membrane and the release paper plus membrane were fed into the gravure printer.

Figure 15:
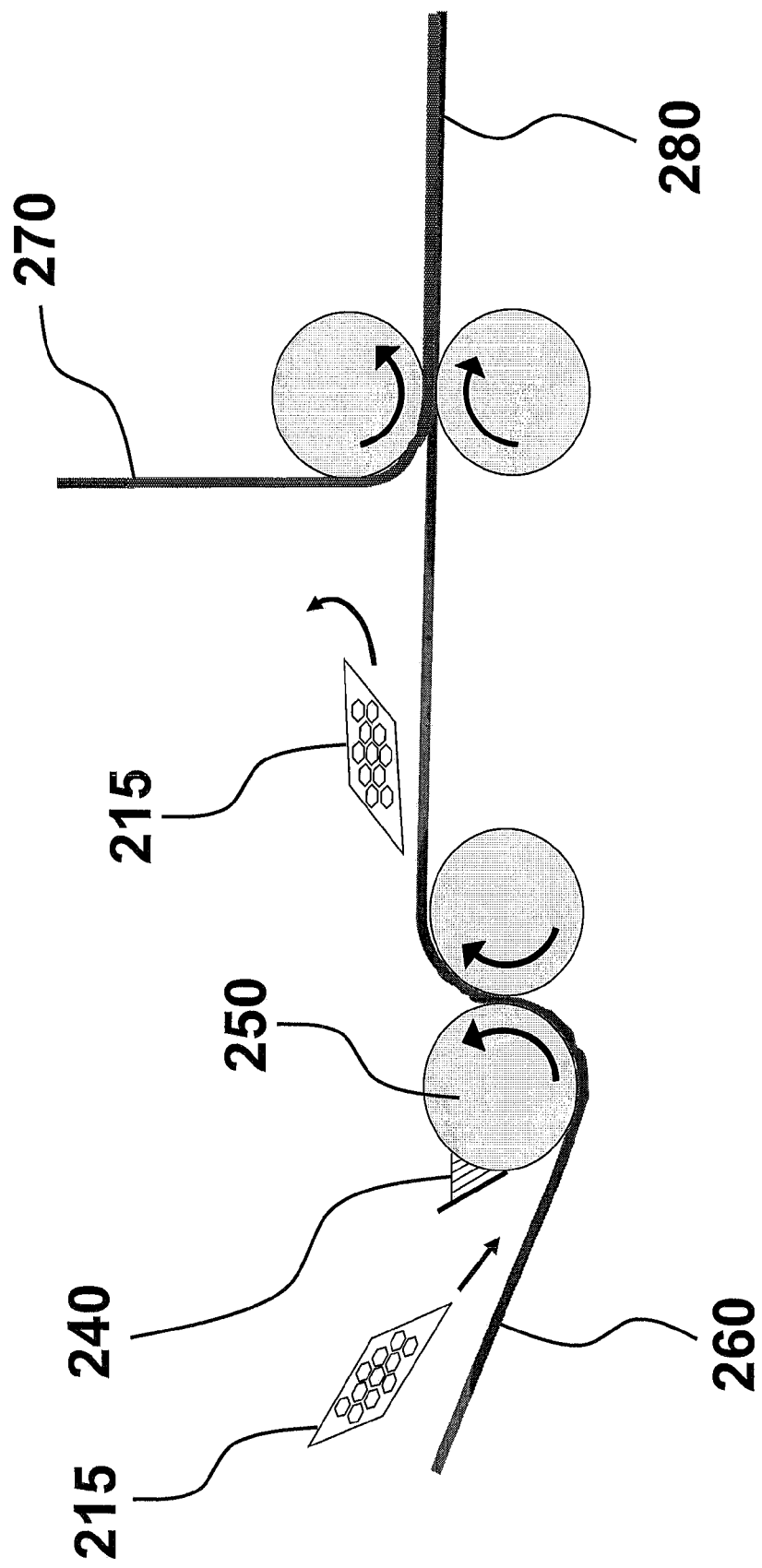
FIG. 15 is a schematic illustration of a process for forming a multi-layered article using release paper to apply a hexagonal adhesive pattern according to at least one exemplary embodiment of the invention.

Turning now to FIG. 15, a portion of the processing line for forming a two-layer multi-layered article can be seen. A polyurethane 240 was obtained and loaded in the printer in order to apply heated adhesive dots to the ePTFE side of the membrane via roll 250. In other words, the ePTFE membrane 260 was fed into roll 250 with the ePTFE facing upward, towards roller 250. 305 micron wide square adhesive dots were applied at a percent area coverage of 83% to the unmasked area of the ePTFE membrane 260.

A length of 137.7 g/m² nylon/elastane stretch woven material (Style Q4410-T0 from China Her Industrial Co., Taipei, Taiwan) was obtained. The stretch woven material was tensioned, the release paper 215 (mask) was removed, and the stretch woven textile 270 was placed onto the adhesive side of the membrane 260. While retaining the tension on the textile 270, the resulting multi-layered article 280 was spooled onto a roll (not shown) and allowed to moisture cure, which required approximately 2 days.

Following moisture curing, the multi-layered article was unspooled and allowed to relax, thereby returning to the initial, untensioned state of the textile. The polyurethane-coated ePTFE was peeled off of the textile and discarded, leaving the adhesive largely attached to the textile. The hexagonal pattern was visible by the naked eye. The sample exhibited localized curling in the areas corresponding to the hexagonal voids in the release paper. The concave surface of these areas was towards the textile side of the multi-layered article.

The width of the curled sections was 6.33 mm, the depth was 2.62 mm, and the radius of curvature was 3.22 mm. The resulting construct weighed 152.4 g/m². The thickness to weight per area ratio of the sample was 0.012 mm/(g/m²). The stretch force of the sample at 20% strain was 0.14 lbf. The stretch force of the raw stretch woven material at 20% strain was 0.73 lbf.

The invention of this application has been described above both generically and with regard to specific embodiments. The invention is not otherwise limited, except for the recitation of the claims set forth below.

Having thus described the invention, what is claimed is:

1. A multi-layered article comprising:
   a first textile; and
   an adhesive layer positioned on said first textile, said adhesive layer containing two or more adhesive regions separated by regions substantially free of adhesive, each said adhesive region containing a plurality of adhesive dots,
   wherein a distance between adjacent adhesive dots within said adhesive regions is less than a distance between consecutive adhesive regions,
   wherein said adhesive regions have at least one distinctive shape,
   wherein each said adhesive region induces a radius of curvature that forms raised portions in said multi-layered article that correspond to said regions substantially free of adhesive, and
   wherein said radius of curvature of said each said adhesive region is from about 1 mm to about 20 mm.

2. The multi-layered article of claim 1, wherein said raised portions are positioned towards said first textile.

3. The multi-layered article of claim 1, wherein said raised portions are positioned towards said adhesive layer.

4. The multi-layered article of claim 1 wherein said at least one distinctive shape is repeated two or more times.

5. The multi-layered article of claim 1, wherein said distinctive shape has a geometric or abstract form.

6. The multi-layered article of claim 1, wherein said multi-layered article has a stretch force at 20% elongation of less than three times the stretch force of said first textile at 20% elongation.

7. The multi-layered article of claim 1, wherein said adhesive dots are distributed non-uniformly within said adhesive regions.

8. The multi-layered article of claim 1, wherein said adhesive dots have substantially the same size within said adhesive regions.

9. The multi-layered article of claim 1, wherein said adhesive dots differ in size within said adhesive regions.

10. The multi-layered article of claim 1, wherein adhesive dots positioned in an outer portion of said adhesive regions have a diameter that is larger than a diameter of adhesive dots positioned on an inner portion of said adhesive regions.

11. The multi-layered article of claim 1, wherein said regions substantially free of adhesive have a width greater than about 2 mm.

12. The multi-layered article of claim 1, wherein a percent area coverage of said adhesive regions in said multi-layered article is at least 30%.

13. The multi-layered article of claim 1, further comprising a second textile on said adhesive layer on a side opposing said first textile.

14. The multi-layered article of claim 1, wherein said first textile is selected from an elastic textile and a shrinkable textile.

15. The multi-layered article of claim 1, wherein said adhesive is a shrinkable adhesive.

16. The multi-layered article of claim 1, wherein at least one of said first textile and said adhesive regions comprises a fire retardant or fire resistant material.

17. A garment comprising the multi-layered article of claim 1.

18. A multi-layered article comprising:
a first textile; and
an adhesive layer positioned on said first textile, said adhesive layer containing first adhesive regions and second adhesive regions,
wherein said first adhesive regions contain an amount of adhesive that is greater than an amount of adhesive present in said second adhesive regions,
wherein said multi-layered article has a stretch force at 20% elongation of less than three times the stretch force of said first textile at 20% elongation
wherein each said first adhesive region induces a radius of curvature that forms raised portions in said multi-layered article that correspond to said second adhesive regions,
wherein said raised portions are positioned towards said first textile.

19. The multi-layered article of claim 18, wherein said second adhesive regions have a width greater than about 2 mm.

20. The multi-layered article of claim 18, wherein said first adhesive regions form at least one distinctive shape, said at least one distinctive shape being repeated two or more times and having a geometric or abstract form.

21. The multi-layered article of claim 18, wherein said first adhesive regions contain a plurality of adhesive dots.

22. The multi-layered article of claim 21, wherein said plurality of adhesive dots have substantially the same size.

23. The multi-layered article of claim 21, wherein said first adhesive regions contain first adhesive dots positioned on an outer portion that have a diameter that is larger than a diameter of second adhesive dots positioned on an inner portion of said first adhesive regions.

24. The multi-layered article of claim 18, wherein at least one of said first adhesive regions comprises a substantially continuous band of adhesive surrounding a plurality of adhesive dots.

25. The multi-layered article of claim 18, wherein at least one of said first adhesive regions comprise strips of adhesive positioned within the first adhesive region such that the strips of adhesive are substantially parallel to each other with said regions substantially free of adhesive interspacing said strips of adhesive.

26. The multi-layered article of claim 18, wherein at least one of said first adhesive regions comprises centrally located regions that are free or substantially free of adhesive.

27. The multi-layered article of claim 18, wherein a percent area coverage of said first adhesive regions in said multi-layered article is at least 30%.

28. The multi-layered article of claim 18, wherein said radius of curvature of said first adhesive regions is from about 1 mm to about 20 mm.

29. The multi-layered article of claim 18, wherein at least one of said first textile and said first adhesive regions comprises a fire retardant or fire resistant material.

30. The multi-layered article of claim 18, wherein said radius of curvature is greater than about 1 mm.

31. A garment comprising the multi-layered article of claim 18.

32. A multi-layered article comprising:
a first textile; and
an adhesive layer positioned on said first textile, said adhesive layer containing at least one first region having a first percent area coverage of adhesive and at least one second region having a second percent area coverage of adhesive, said first percent area coverage of adhesive being greater than said second area coverage of adhesive,
wherein said first region forms at least one distinctive shape, said at least one shape being repeated two or more times and having a geometric or abstract form and
wherein each said first region having a first percent area of coverage induces a radius of curvature that forms raised portions in said multi-layered article that correspond to said second regions having a second percent area of coverage, and
wherein said at least one first region contains adhesive dots.

33. The multi-layered article of claim 32, wherein said adhesive dots are distributed non-uniformly within said at least one first region.

34. The multi-layered article of claim 32, wherein said adhesive dots positioned on an outer portion of said at least one first region have a diameter that is larger than said adhesive dots positioned on an inner portion of said at least one first region.

35. The mufti-layered article of claim 32, further comprising a second textile on said adhesive layer on a side opposing said first textile.

36. The multi-layered article of claim 32, wherein said first textile is selected from an elastic textile and a shrinkable textile.

37. The multi-layered article of claim 32, wherein said adhesive layer comprises a shrinkable adhesive.

38. The multi-layered article of claim 32, wherein said multi-layered article has a stretch force at 20% elongation of less than three times the stretch force of said first textile at 20% elongation.

39. The multi-layered article of claim 32, wherein at least one of said first textile and said first region comprises a fire retardant or fire resistant material.

40. The multi-layered article of claim 32, wherein said radius of curvature is greater than about 1 mm.

41. A garment comprising the multi-layered article of claim 32.

42. A multi-layered article comprising:
a first textile; and
an adhesive layer positioned on said first textile, said adhesive layer containing first adhesive regions and second adhesive regions,
wherein said first adhesive regions contain an amount of adhesive that is greater than an amount of adhesive present in said second adhesive regions,
wherein said multi-layered article has a stretch force at 20% elongation of less than three times the stretch force of said first textile at 20% elongation,
wherein each said first adhesive region induces a radius of curvature that forms raised portions in said multi-layered article that correspond to said second adhesive regions, and
wherein said raised portions are positioned towards said first adhesive layer.

43. The multi-layered article of claim 42, wherein said second adhesive regions have a width greater than about 2 mm.

44. The multi-layered article of claim 42, wherein said first adhesive regions form at least one distinctive shape, said at least one distinctive shape being repeated two or more times and having a geometric or abstract form.

45. The multi-layered article of claim 42, wherein said first adhesive regions contain a plurality of adhesive dots.

46. The multi-layered article of claim 45, wherein said plurality of adhesive dots have substantially the same size.

47. The multi-layered article of claim 45, wherein said first adhesive regions contain first adhesive dots positioned on an outer portion that have a diameter that is larger than a diameter of second adhesive dots positioned on an inner portion of said first adhesive regions.

48. The multi-layered article of claim 42, wherein at least one of said first adhesive regions comprises a substantially continuous band of adhesive surrounding a plurality of adhesive dots.

49. The multi-layered article of claim 42, wherein at least one of said first adhesive regions comprise strips of adhesive positioned within the first adhesive region such that the strips of adhesive are substantially parallel to each other with said regions substantially free of adhesive interspacing said strips of adhesive.

50. The multi-layered article of claim 42, wherein at least one of said first adhesive regions comprises centrally located regions that are free or substantially free of adhesive.

51. The multi-layered article of claim 42, wherein a percent area coverage of said first adhesive regions in said multi-layered article is at least 30%.

52. The multi-layered article of claim 42, wherein said radius of curvature of said first adhesive regions is from about 1 mm to about 20 mm.

53. The multi-layered article of claim 42, wherein at least one of said first textile and said first adhesive regions comprises a fire retardant or fire resistant material.

54. The multi-layered article of claim 42, wherein said radius of curvature is greater than about 1 mm.

55. A garment comprising the multi-layered article of claim 42.

56. A multi-layered article comprising:
a first textile; and
an adhesive layer positioned on said first textile, said adhesive layer containing at least one first region having a first percent area coverage of adhesive and at least one second region having a second percent area coverage of adhesive, said first percent area coverage of adhesive being greater than said second area coverage of adhesive,
wherein said first region forms at least one distinctive shape, said at least one shape being repeated two or more times and having a geometric or abstract form,
wherein each said first region having a first percent area of coverage induces a radius of curvature that forms raised portions in said multi-layered article that correspond to said second regions having a second percent area of coverage, and
wherein at least one of said first region comprises a continuous band of adhesive surrounding a plurality of adhesive dots.

57. The multi-layered article of claim 56, further comprising a second textile on said adhesive layer on a side opposing said first textile.

58. The multi-layered article of claim 56, wherein said first textile is selected from an elastic textile and a shrinkable textile.

59. The multi-layered article of claim 56, wherein said adhesive layer comprises a shrinkable adhesive.

60. The multi-layered article of claim 56, wherein said multi-layered article has a stretch force at 20% elongation of less than three times the stretch force of said first textile at 20% elongation.

61. The multi-layered article of claim 56, wherein at least one of said first textile and said first region comprises a fire retardant or fire resistant material.

62. The multi-layered article of claim 56, wherein said radius of curvature is greater than about 1 mm.

63. A garment comprising the multi-layered article of claim 56.

64. A multi-layered article comprising:
a first textile; and
an adhesive layer positioned on said first textile, said adhesive layer containing at least one first region having a first percent area coverage of adhesive and at least one second region having a second percent area coverage of adhesive, said first percent area coverage of adhesive being greater than said second area coverage of adhesive; and
a second textile on said adhesive layer on a side opposing said first textile
wherein said first region forms at least one distinctive shape, said at least one shape being repeated two or more times and having a geometric or abstract form and
wherein each said first region having a first percent area of coverage induces a radius of curvature that forms raised portions in said multi-layered article that correspond to said second regions having a second percent area of coverage.

65. The multi-layered article of claim 64, wherein said at least one first region contains adhesive dots.

66. The multi-layered article of claim 65, wherein said adhesive dots are distributed non-uniformly within said at least one first region.

67. The multi-layered article of claim 65, wherein said adhesive dots positioned on an outer portion of said at least one first region have a diameter that is larger than said adhesive dots positioned on an inner portion of said at least one first region.

68. The multi-layered article of claim 64, wherein at least one of said first region comprises a continuous band of adhesive surrounding a plurality of adhesive dots.

69. The multi-layered article of claim 64, wherein said first textile is selected from an elastic textile and a shrinkable textile.

70. The multi-layered article of claim 64, wherein said adhesive layer comprises a shrinkable adhesive.

71. The multi-layered article of claim 64, wherein said multi-layered article has a stretch force at 20% elongation of less than three times the stretch force of said first textile at 20% elongation.

72. The multi-layered article of claim 64, wherein at least one of said first textile and said first region comprises a fire retardant or fire resistant material.

73. The multi-layered article of claim 64, wherein said radius of curvature is greater than about 1 mm.

74. A garment comprising the multi-layered article of claim 64.

* * * * *